US012595973B2

(12) United States Patent
Von Behrens et al.

(10) Patent No.: US 12,595,973 B2
(45) Date of Patent: Apr. 7, 2026

(54) THERMAL ENERGY STORAGE SYSTEM WITH HIGH EFFICIENCY HEATER CONTROL

(71) Applicant: Rondo Energy, Inc., Alameda, CA (US)

(72) Inventors: Peter Emery Von Behrens, Oakland, CA (US); John Whitney, Haynesville, LA (US)

(73) Assignee: Rondo Energy, Inc., Alameda, CA (US)

( * ) Notice: Subject to any disclaimer, the term of this patent is extended or adjusted under 35 U.S.C. 154(b) by 0 days.

(21) Appl. No.: 19/218,096

(22) Filed: May 23, 2025

(65) Prior Publication Data

US 2025/0362093 A1 Nov. 27, 2025

Related U.S. Application Data

(60) Provisional application No. 63/651,851, filed on May 24, 2024.

(51) Int. Cl.
*F28D 20/00* (2006.01)
*H05B 1/02* (2006.01)

(52) U.S. Cl.
CPC ......... *F28D 20/0056* (2013.01); *H05B 1/023* (2013.01); *F28D 2020/0069* (2013.01)

(58) Field of Classification Search
CPC ......... F28D 20/0056; F28D 2020/0069; H05B 1/023
See application file for complete search history.

(56) References Cited

U.S. PATENT DOCUMENTS

| | | | |
|---|---|---|---|
| 1,089,951 | A | 3/1914 | Otto |
| 1,700,542 | A | 1/1929 | O'Donnell |
| 1,700,642 | A | 1/1929 | Meindersma |
| 2,833,532 | A | 5/1958 | Ries |
| 3,103,917 | A | 9/1963 | Bauer et al. |

(Continued)

FOREIGN PATENT DOCUMENTS

| | | | |
|---|---|---|---|
| AU | 2012292959 | B2 | 2/2016 |
| AU | 2016100264 | A4 | 4/2016 |

(Continued)

OTHER PUBLICATIONS

International Search Report and Written Opinion mailed on Aug. 29, 2025 for International Application No. PCT/US2025/030863, 19 pages.

(Continued)

*Primary Examiner* — Travis Ruby
(74) *Attorney, Agent, or Firm* — Procopio, Cory, Hargreaves & Savitch LLP; Matt Rainey

(57) ABSTRACT

A thermal energy storage (TES) system converts variable renewable electricity (VRE) to continuous heat at over 900° C. Intermittent electrical energy heats a solid medium. Heat from the solid medium is delivered continuously on demand. Heat delivery via flowing gas establishes a thermocline which maintains high outlet temperature throughout discharge. The delivered heat which may be used for processes including power generation and cogeneration. The TES system is configured to include control system components that reduce thermal losses associated with component inefficiency.

9 Claims, 9 Drawing Sheets

(56) References Cited

U.S. PATENT DOCUMENTS

| | | | |
|---|---|---|---|
| 3,381,113 A | 4/1968 | Jacques et al. | |
| 3,549,136 A | 12/1970 | Baab et al. | |
| 3,788,066 A | 1/1974 | Nebgen | |
| 3,908,381 A | 9/1975 | Barber et al. | |
| 3,995,434 A | 12/1976 | Kato et al. | |
| 4,011,430 A * | 3/1977 | Witkin | H05B 1/023 219/486 |
| 4,110,987 A | 9/1978 | Cahn et al. | |
| 4,124,061 A | 11/1978 | Mitchell et al. | |
| 4,127,161 A | 11/1978 | Clyne et al. | |
| 4,146,057 A | 3/1979 | Friedman et al. | |
| 4,172,442 A | 10/1979 | Boblitz | |
| 4,200,783 A | 4/1980 | Ehret | |
| 4,222,365 A | 9/1980 | Thomson | |
| 4,234,782 A | 11/1980 | Barabas et al. | |
| 4,237,692 A | 12/1980 | Ahrens et al. | |
| 4,312,324 A | 1/1982 | Ross et al. | |
| 4,329,592 A | 5/1982 | Wagner et al. | |
| 4,397,962 A | 8/1983 | Schockmel | |
| 4,438,630 A | 3/1984 | Rowe | |
| 4,524,756 A | 6/1985 | Laverman | |
| 4,651,810 A | 3/1987 | Triessnig | |
| 4,809,523 A | 3/1989 | Vandenberg | |
| 4,874,034 A | 10/1989 | Hirata et al. | |
| 4,979,374 A | 12/1990 | Kabakov et al. | |
| 5,154,224 A | 10/1992 | Yasui et al. | |
| 5,286,472 A | 2/1994 | Fulford | |
| 5,384,489 A | 1/1995 | Bellac | |
| 5,416,416 A | 5/1995 | Bisher | |
| 5,419,388 A | 5/1995 | Hickel et al. | |
| 5,553,604 A | 9/1996 | Frei | |
| 5,634,313 A | 6/1997 | Mögling | |
| 5,924,477 A | 7/1999 | Doru | |
| 6,274,855 B1 | 8/2001 | Tatematsu et al. | |
| 6,302,188 B1 | 10/2001 | Ruhl et al. | |
| 6,322,356 B1 | 11/2001 | Gupta et al. | |
| 6,631,754 B1 | 10/2003 | Bremont et al. | |
| 7,213,409 B1 | 5/2007 | Nuckols | |
| 7,693,402 B2 | 4/2010 | Hudson et al. | |
| 7,800,024 B2 | 9/2010 | Duguay et al. | |
| 8,226,917 B2 | 7/2012 | Fan et al. | |
| 8,544,275 B2 | 10/2013 | Shinnar | |
| 8,701,773 B2 | 4/2014 | O'Donnell et al. | |
| 8,960,182 B2 | 2/2015 | Magaldi et al. | |
| 9,370,044 B2 | 6/2016 | McDonald | |
| 9,512,826 B2 | 12/2016 | Rodionov et al. | |
| 9,556,708 B2 | 1/2017 | Schneider et al. | |
| 9,642,188 B2 * | 5/2017 | Bach | H05B 3/00 |
| 9,816,490 B2 | 11/2017 | Conlon | |
| 9,816,491 B2 | 11/2017 | Perry | |
| 9,948,140 B2 | 4/2018 | Pietsch et al. | |
| 9,989,271 B1 | 6/2018 | Becker | |
| 10,113,535 B2 | 10/2018 | Conlon | |
| 10,221,726 B2 | 3/2019 | Balczunas et al. | |
| 10,334,881 B1 | 7/2019 | Conley et al. | |
| 10,345,050 B2 | 7/2019 | Pietsch et al. | |
| 10,527,026 B2 | 1/2020 | Muir et al. | |
| 10,767,935 B2 | 9/2020 | Bergan et al. | |
| 10,775,111 B2 | 9/2020 | Kerth | |
| 10,876,521 B2 | 12/2020 | Anderson et al. | |
| 11,038,431 B2 * | 6/2021 | Ness | H02M 7/219 |
| 11,352,951 B2 | 6/2022 | Apte et al. | |
| 11,391,181 B2 | 7/2022 | O'Donnell et al. | |
| 11,459,944 B2 | 10/2022 | Robinson | |
| 11,480,160 B1 | 10/2022 | Mokheimer et al. | |
| 11,603,776 B2 | 3/2023 | O'Donnell et al. | |
| 11,809,153 B1 | 11/2023 | Kearns et al. | |
| 11,994,347 B2 | 5/2024 | Ponec et al. | |
| 2003/0101728 A1 | 6/2003 | Wakana et al. | |
| 2003/0113255 A1 | 6/2003 | Harlan | |
| 2004/0062063 A1 | 4/2004 | Siri | |
| 2004/0099261 A1 | 5/2004 | Litwin | |
| 2004/0148922 A1 | 8/2004 | Pinkerton | |
| 2004/0182081 A1 | 9/2004 | Sim et al. | |
| 2004/0211215 A1 | 10/2004 | Maier-Laxhuber et al. | |
| 2005/0095500 A1 | 5/2005 | Corless et al. | |
| 2005/0126172 A1 | 6/2005 | Hudson et al. | |
| 2006/0107664 A1 | 5/2006 | Hudson et al. | |
| 2006/0174622 A1 | 8/2006 | Skowronski | |
| 2006/0179840 A1 | 8/2006 | Murphy et al. | |
| 2006/0211777 A1 | 9/2006 | Severinsky | |
| 2006/0231466 A1 | 10/2006 | Nuber | |
| 2006/0266039 A1 | 11/2006 | Skowronski et al. | |
| 2006/0277910 A1 | 12/2006 | Hoetger | |
| 2007/0209365 A1 | 9/2007 | Hamer et al. | |
| 2007/0220889 A1 | 9/2007 | Nayef et al. | |
| 2008/0000231 A1 | 1/2008 | Litwin et al. | |
| 2008/0066736 A1 | 3/2008 | Zhu | |
| 2008/0127647 A1 | 6/2008 | Leitner | |
| 2008/0134681 A1 | 6/2008 | Nayef et al. | |
| 2008/0279761 A1 | 11/2008 | Kimura et al. | |
| 2008/0318143 A1 | 12/2008 | Nakayama et al. | |
| 2009/0038668 A1 | 2/2009 | Plaisted | |
| 2009/0090109 A1 | 4/2009 | Mills et al. | |
| 2009/0117633 A1 | 5/2009 | Bradley et al. | |
| 2009/0208402 A1 | 8/2009 | Rossi | |
| 2009/0320828 A1 | 12/2009 | Koketsu et al. | |
| 2010/0005966 A1 | 1/2010 | Wibberley | |
| 2010/0101462 A1 | 4/2010 | Hayashi et al. | |
| 2010/0132391 A1 | 6/2010 | Barot | |
| 2010/0178156 A1 | 7/2010 | Rivas Cortes et al. | |
| 2010/0195357 A1 | 8/2010 | Fornage et al. | |
| 2010/0229523 A1 | 9/2010 | Holt et al. | |
| 2010/0251711 A1 | 10/2010 | Howes et al. | |
| 2010/0295306 A1 | 11/2010 | Ridnik et al. | |
| 2011/0083443 A1 | 4/2011 | Jockenhoevel et al. | |
| 2011/0226440 A1 | 9/2011 | Bissell et al. | |
| 2011/0247335 A1 | 10/2011 | Schmid et al. | |
| 2011/0277469 A1 | 11/2011 | Brenmiller et al. | |
| 2011/0286902 A1 | 11/2011 | Fan et al. | |
| 2011/0289924 A1 | 12/2011 | Pietsch | |
| 2012/0067047 A1 | 3/2012 | Peterson et al. | |
| 2012/0097151 A1 | 4/2012 | Matsuno et al. | |
| 2012/0102950 A1 | 5/2012 | Turchi | |
| 2012/0131898 A1 | 5/2012 | Mokheimer et al. | |
| 2012/0151926 A1 | 6/2012 | Labbe | |
| 2012/0167559 A1 | 7/2012 | Havel | |
| 2012/0167567 A1 | 7/2012 | Kleine | |
| 2012/0227926 A1 | 9/2012 | Field et al. | |
| 2012/0241677 A1 | 9/2012 | Perkins et al. | |
| 2012/0255309 A1 | 10/2012 | Venetos et al. | |
| 2012/0286524 A1 | 11/2012 | Bronicki | |
| 2013/0025817 A1 | 1/2013 | Callaghan | |
| 2013/0047976 A1 | 2/2013 | Kaftori | |
| 2013/0081394 A1 | 4/2013 | Perry | |
| 2013/0081395 A1 | 4/2013 | Frey et al. | |
| 2013/0118169 A1 | 5/2013 | Milam et al. | |
| 2013/0175006 A1 | 7/2013 | Robinson et al. | |
| 2013/0227947 A1 | 9/2013 | Bronicki et al. | |
| 2014/0004469 A1 | 1/2014 | Recourt et al. | |
| 2014/0008033 A1 | 1/2014 | Howes et al. | |
| 2014/0053554 A1 | 2/2014 | Tartibi et al. | |
| 2014/0074314 A1 | 3/2014 | Niknafs et al. | |
| 2014/0102073 A1 | 4/2014 | Pang et al. | |
| 2014/0110080 A1 | 4/2014 | Bergan | |
| 2014/0116069 A1 | 5/2014 | Peterson et al. | |
| 2014/0190469 A1 | 7/2014 | O'Donnell et al. | |
| 2014/0216717 A1 | 8/2014 | O'Donnell et al. | |
| 2014/0223906 A1 | 8/2014 | Gee et al. | |
| 2014/0224469 A1 | 8/2014 | Mirmobin et al. | |
| 2014/0366536 A1 | 12/2014 | Muren | |
| 2015/0007577 A1 | 1/2015 | Li et al. | |
| 2015/0027122 A1 | 1/2015 | Brunhuber | |
| 2015/0033740 A1 | 2/2015 | Anderson et al. | |
| 2015/0053266 A1 | 2/2015 | Chen et al. | |
| 2015/0134120 A1 | 5/2015 | Sun et al. | |
| 2015/0143806 A1 | 5/2015 | Friesth | |
| 2015/0143811 A1 | 5/2015 | Pang et al. | |
| 2015/0167489 A1 | 6/2015 | Heiligenstein et al. | |
| 2015/0176920 A1 | 6/2015 | Vendeirinho | |
| 2015/0224850 A1 | 8/2015 | Bank et al. | |
| 2015/0267566 A1 | 9/2015 | Vamvas | |
| 2015/0276234 A1 | 10/2015 | Muro et al. | |
| 2015/0295508 A1 | 10/2015 | Conry | |

(56) References Cited

U.S. PATENT DOCUMENTS

2015/0354545 A1 12/2015 Conlon
2015/0369125 A1 12/2015 Reiter et al.
2016/0130709 A1 5/2016 Hong et al.
2016/0146110 A1 5/2016 Hackstein et al.
2016/0164451 A1 6/2016 Lenert et al.
2016/0208657 A1 7/2016 Brückner et al.
2016/0214910 A1 7/2016 King
2016/0281607 A1 9/2016 Asati et al.
2016/0301093 A1 10/2016 Bosmann et al.
2016/0355932 A1 12/2016 Reytier et al.
2017/0051949 A1 2/2017 Uselton
2017/0058768 A1 3/2017 Bergins et al.
2017/0093163 A1 3/2017 Johnson et al.
2017/0204741 A1 7/2017 Hogen et al.
2017/0241649 A1 8/2017 Cave
2017/0241669 A1 8/2017 von Behrens
2017/0283713 A1 10/2017 Stephens et al.
2017/0362090 A1 12/2017 Melsert et al.
2017/0362724 A1 12/2017 Planque et al.
2018/0003445 A1 1/2018 Bergan et al.
2018/0028967 A1 2/2018 Balfe et al.
2018/0038352 A1 2/2018 Conlon
2018/0073777 A1 3/2018 O'Donnell et al.
2018/0083449 A1 3/2018 Green
2018/0106165 A1 4/2018 Barmeier
2018/0106739 A1 4/2018 Esmaili et al.
2018/0163574 A1 6/2018 Bailey et al.
2018/0179955 A1 6/2018 Apte et al.
2018/0207557 A1 7/2018 Nellis
2018/0216010 A1 8/2018 Hong
2018/0231316 A1 8/2018 Watremetz et al.
2018/0238563 A1 8/2018 Stepa et al.
2018/0245485 A1 8/2018 Conlon
2018/0278439 A1 9/2018 Cox
2018/0292097 A1 10/2018 Specter
2018/0347406 A1 12/2018 Friesth
2018/0372337 A1 12/2018 Walker
2018/0372420 A1 12/2018 Ahadi et al.
2019/0003308 A1 1/2019 Laughlin
2019/0043624 A1 2/2019 Fork et al.
2019/0045617 A1 2/2019 Fork et al.
2019/0096535 A1 3/2019 Olshansky et al.
2019/0140477 A1 5/2019 Yang et al.
2019/0162482 A1 5/2019 Kerth
2019/0170436 A1 6/2019 De et al.
2019/0186786 A1 6/2019 Neiser
2019/0226462 A1 7/2019 Conlon
2019/0245224 A1 8/2019 Lacroix et al.
2019/0331098 A1 10/2019 von Behrens et al.
2019/0359894 A1 11/2019 Heidel et al.
2020/0095984 A1 3/2020 Karni et al.
2020/0124356 A1 4/2020 Ma et al.
2020/0136202 A1 4/2020 Trawick
2020/0172815 A1 6/2020 Stephens et al.
2020/0217518 A1 7/2020 Field et al.
2020/0232345 A1 7/2020 Zwinkels
2020/0251909 A1 8/2020 Falk et al.
2020/0332201 A1 10/2020 Koseoglu et al.
2020/0346165 A1 11/2020 Lu et al.
2020/0358112 A1 11/2020 Chatroux et al.
2020/0378599 A1 12/2020 Risseeuw et al.
2020/0386447 A1 12/2020 Wang
2021/0053689 A1 2/2021 Lynn et al.
2021/0094834 A1 4/2021 Chen et al.
2021/0143446 A1 5/2021 Ponec et al.
2021/0172685 A1 6/2021 Bergan et al.
2021/0190044 A1 6/2021 Anderson et al.
2021/0207527 A1 7/2021 Robinson
2021/0211066 A1 7/2021 Vavilpalli et al.
2021/0325069 A1 10/2021 Cotton et al.
2021/0328544 A1 10/2021 Johnson et al.
2021/0389056 A1 12/2021 Calvet et al.
2022/0049615 A1 2/2022 Truong
2022/0049631 A1 2/2022 Deng
2022/0060142 A1 2/2022 Akhavan-Tafti
2022/0085603 A1 3/2022 McNamara et al.
2022/0090827 A1 3/2022 Magaldi et al.
2022/0132633 A1 4/2022 Forsberg et al.
2022/0146205 A1 5/2022 Eronen et al.
2022/0170386 A1 6/2022 O'Donnell et al.
2022/0220867 A1* 7/2022 O'Donnell .............. C25B 1/042
2022/0228271 A1 7/2022 Ashok et al.
2022/0228772 A1 7/2022 Murata et al.
2022/0268179 A1 8/2022 O'Donnell et al.
2022/0290929 A1 9/2022 Doerbeck
2022/0307386 A1 9/2022 Savic et al.
2022/0403759 A1 12/2022 Stapp, III et al.
2022/0412228 A1 12/2022 Ponec et al.
2023/0052951 A1 2/2023 Migl et al.
2023/0216297 A1 7/2023 Peri et al.
2023/0287808 A1 9/2023 Conlon
2023/0407186 A1 12/2023 Sundaram et al.
2024/0092646 A1 3/2024 Isobe et al.
2024/0418106 A1 12/2024 Bostick et al.
2025/0026986 A1 1/2025 Zellhuber et al.

FOREIGN PATENT DOCUMENTS

AU 2016204109 B2 5/2018
CH 703751 A1 3/2012
CN 1559893 A 1/2005
CN 101799200 A 8/2010
CN 101592439 B 4/2011
CN 102897812 A 1/2013
CN 104242433 A 12/2014
CN 104296577 B 4/2016
CN 105575659 A 5/2016
CN 105605957 A 5/2016
CN 105948037 A 9/2016
CN 106052451 A 10/2016
CN 106247836 A 12/2016
CN 107246732 A 10/2017
CN 107872196 A 4/2018
CN 108167034 A 6/2018
CN 108204760 A 6/2018
CN 108362151 A 8/2018
CN 108362152 A 8/2018
CN 108612634 A 10/2018
CN 106767074 B 12/2018
CN 109883241 A 6/2019
CN 110411260 A 11/2019
CN 111256364 A 6/2020
CN 210802160 U 6/2020
CN 211183438 U 8/2020
CN 111655989 A 9/2020
CN 110725725 B 12/2020
CN 112113203 A 12/2020
CN 212157096 U 12/2020
CN 113835372 A 12/2021
CN 114754617 A 7/2022
CN 109445511 B 3/2024
DE 19808810 C1 6/1999
DE 10029732 A1 1/2002
DE 102008051384 B3 2/2010
DE 102009020531 B3 4/2011
DE 102012024526 B4 9/2014
DE 102013212981 A1 1/2015
DE 102017212684 A1 1/2019
DE 102019210737 A1 1/2021
EP 79247 A1 5/1983
EP 794161 B1 2/2003
EP 1930587 A2 6/2008
EP 2372116 A1 10/2011
EP 2722496 A2 4/2014
EP 3081770 A1 10/2016
EP 3324018 A1 5/2018
EP 3486594 A1 5/2019
EP 2837086 B1 11/2019
EP 3245388 B1 11/2019
EP 3574191 A1 12/2019
EP 3725917 A1 10/2020
EP 2909547 B1 9/2021
EP 3642296 B1 1/2022
GB 2109026 A 5/1983

(56) References Cited

FOREIGN PATENT DOCUMENTS

| | | | |
|---|---|---|---|
| GB | 2152652 | A | 8/1985 |
| GB | 2477801 | A | 8/2011 |
| IL | 284451 | | 8/2021 |
| JP | S63-119874 | U | 8/1988 |
| JP | 2006145200 | A | 6/2006 |
| KR | 2001-0100320 | A | 11/2001 |
| KR | 102308531 | B1 | 10/2021 |
| MA | 40029 | A | 12/2015 |
| TW | 202100240 | A | 1/2021 |
| WO | WO 1980/000170 | | 2/1980 |
| WO | WO 2007/108014 | A1 | 9/2007 |
| WO | WO 2008/052249 | A1 | 5/2008 |
| WO | WO 2008/108870 | A1 | 9/2008 |
| WO | WO 2009/152562 | A1 | 12/2009 |
| WO | WO 2011/066039 | A1 | 6/2011 |
| WO | WO 2011/077248 | A2 | 6/2011 |
| WO | WO 2011/109514 | A1 | 9/2011 |
| WO | WO 2012/123853 | A1 | 9/2012 |
| WO | WO 2012/127178 | A1 | 9/2012 |
| WO | WO 2012/150969 | A1 | 11/2012 |
| WO | WO 2013/020176 | A1 | 2/2013 |
| WO | WO 2014/063191 | A1 | 5/2014 |
| WO | WO 2014/151843 | A2 | 9/2014 |
| WO | WO 2015/149124 | A1 | 10/2015 |
| WO | WO 2015/187423 | A2 | 12/2015 |
| WO | 2016/062425 | A1 | 4/2016 |
| WO | WO 2016/065191 | A1 | 4/2016 |
| WO | WO 2016/150455 | A1 | 9/2016 |
| WO | WO 2017/001710 | A1 | 1/2017 |
| WO | WO 2017/049320 | A1 | 3/2017 |
| WO | WO 2017/147022 | A1 | 8/2017 |
| WO | WO 2018/011363 | A1 | 1/2018 |
| WO | 2018/024409 | A1 | 2/2018 |
| WO | WO 2018/101989 | A1 | 6/2018 |
| WO | WO 2018/164647 | A | 9/2018 |
| WO | WO 2019/020562 | A1 | 1/2019 |
| WO | WO 2019/149623 | A1 | 8/2019 |
| WO | WO 2019/224538 | A1 | 11/2019 |
| WO | WO 2020/068758 | A1 | 4/2020 |
| WO | WO 2020/136456 | A1 | 7/2020 |
| WO | WO 2020/254001 | A1 | 12/2020 |
| WO | WO 2022/086630 | A1 | 4/2022 |
| WO | WO 2022/187903 | A1 | 9/2022 |
| WO | 2023/219610 | A | 11/2023 |
| ZA | 201603514 | B | 11/2018 |

OTHER PUBLICATIONS

Waste Heat Recovery: Technology and Opportunities in U.S. Industry, prepared by BCS, Incorporation, Mar. 2008, in 112 pages.
International Search Report and Written Opinion mailed on Apr. 25, 2025 for International Application No. PCT/US2024/051145, 19 pages.
"Ethylene Production via Cracking of Ethane-Propane", Chemical Engineering, Nov. 1, 2015, Total pp. 4.
"Matching Time Of Use Periods With Grid Conditions Maximizes Use Of Renewable Resources", California ISO, Outcropping Way, Folsom, 2015, Total pp. 2.
"Miscibility Gap Alloys", University of Newcastle, accessed at https://miscibilitygapalloy.blogspot.com/p/how-did-it-stater-ted.html on Apr. 2, 2022.
Aaron Rimpel et al., "Liquid Air Combined Cycle (LACC) for Power and Storage", Thermal-Mechanical-Chemical Energy Storage (TMCES) Workshop, Aug. 10-11, 2021, Total pp. 6.
Alexis Mckittrick, "Low Temperature & Coproduced Resources Reservoir Thermal Energy Storage (RTES) Portfolio", Geothermal Technologies Office, U.S. Department of Energy, dated Feb. 2022. Total pp. 4.
AMETEK Process Instruments, "Reduce Nox Emissions While Improving Fuel Efficiency", EDG Series Gas Analyzers, Year: 2018, in 2 pages.
Anthony Rawson et al., "Effective conductivity of Cu—Fe and Sn—Al miscibility gap alloys", International Journal of Heat and Mass Transfer, vol. 77, Oct. 2014, pp. 395-405, Total pp. 11.
Antoni Gil et al., "State of the art on high temperature thermal energy storage for power generation. Part 1—Concepts, materials and modellization", Renewable and Sustainable Energy Reviews, vol. 14, Issue 1, Jan. 2010, pp. 31-55, Total pp. 25.
Audrey Barucchi, "Calix files a new patent for zero emissions iron and steel", https://www.calix.global/co2-mitigation-focus-area/new-patent-for-zero-emissions-iron-and-steel/, Nov. 23, 2021, Total pp. 5.
Bao Truong, "Malta Pumped Heat Energy Storage System Green Heat & Power Application", Energy Storage for Manufacturing and Industrial Decarbonization Workshop, Feb. 9, 2022, Total pp. 5.
Ben Bollinger, "Malta Pumped Heat Energy Storage", Malta, Aug. 10, 2021, Total pp. 9.
Cédric Philibert, "Renewable Energy for Industry", Renewable Energy Division, International Energy Agency, Nordic Pavillion, COP23, Fidji—Bonn, Nov. 15, 2017, Total pp. 17.
Charles Forsberg et al., "Coupling heat storage to nuclear reactors for variable electricity output with baseload reactor operation", The Electricity Journal, vol. 31, Issue 3, Apr. 2018, pp. 23-31, Total pp. 9.
Charles Forsberg et al., "Variable Electricity from Base-load Nuclear Power Plants Using Stored Heat", International Congress on Advances in Nuclear Power Plants (ICAPP 2015), May 2015, Total pp. 12.
Charles Forsberg, "Heat Storage and the Electricity Grid Integrating Nuclear and Renewables into a Low-Carbon Economic Grid", Massachusetts Institute of Technology, Jan. 2017, Massachusetts, Cambridge, Total pp. 114.
Charles Forsberg, "Hybrid systems to address seasonal mismatches between electricity production and demand in nuclear renewable electrical grids", Energy Policy, vol. 62, Nov. 2013, pp. 333-341, Total pp. 9.
Charles W Forsberg et al., "Converting excess low-price electricity into high-temperature stored heat for industry and high-value electricity production", The Electricity Journal, vol. 30, Issue 6, Jul. 2017, pp. 42-52, Total pp. 11.
Christopher Fraughton, "Electro-Thermal Energy Storage General Presentation", MAN Energy Solutions, Aug. 2021, Total pp. 23.
CK-12 Foundation, "Saturated Hydrocarbon", Apr. 2, 2022, Total pp. 8.
Clifford K. Ho, "High-Temperature Thermal Storage in Moving and Fixed Particle Beds", Thermal-Mechanical-Chemical Energy Storage (TMCES) Workshop, San Antonio, TX, dated Aug. 10, 2021. Total pp. 13.
Cowper Stove An overview ScienceDirect Topics, Sep. 13, 2021, Total pp. 25.
D. Fernandes et al., Thermal energy storage: "How previous findings determine current research priorities", Energy, vol. 39, Issue 1, Mar. 2012, pp. 246-257, Total pp. 12.
Daniel C Stack et al., "Performance of firebrick resistance-heated energy storage for industrial heat applications and round-trip electricity storage", Applied Energy, vol. 242, May 15, 2019, pp. 782-796, Total pp. 15.
Daniel Christopher Stack, "Conceptual Design and Performance Characteristics of Firebrick Resistance-Heated Energy Storage for Industrial Heat Supply and Variable Electricity Production", Thesis, Master of Science in Nuclear Science and Engineering, Massachusetts Institute of Technology, Feb. 2017, Total pp. 166.
Daniel Christopher Stack, "Development of high-temperature firebrick resistance-heated energy storage (FIRES) using doped ceramic heating system", Thesis, Doctor of Philosophy in Nuclear Science and Engineering, Massachusetts Institute of Technology, Feb. 2021, Total pp. 121.
Daniel Stack et al., "Joule Hive-Replacing fire with renewable heat", Aug. 28, 2021, Total pp. 15.
David Bierman, "Clean, affordable, and reliable heat & electricity", Antora Energy, Feb. 2022, Total pp. 9.
David L. Chandler "MIT News: Turning desalination waste into a useful resource" MIT News Office, Feb. 13, 2019 (Cited in NFOA dated Sep. 14, 2022 in related U.S. Appl. No. 17/650,522.).

(56) References Cited

OTHER PUBLICATIONS

David Roberts, "Solar power's greatest challenge was discovered 10 years ago. It looks like a duck", www.vox.com, Aug. 29, 2018, Total pp. 19.
Dr. Avi Shultz, "Concentrating Solar-thermal Power and Thermal Energy Storage", U.S. Department of Energy, dated Feb. 8, 2022. Total pp. 7.
Dr. Avi Shultz, "Industrial Decarbonization:Renewable Process Heating from Concentrating Solar Thermal", U.S. Department of Energy, dated Feb. 8, 2022. Total pp. 6.
Dr. Eric L. Miller, "The Hydrogen Energy Earthshot and H2@Scale: Importance to Industrial Decarbonization", Energy StorM Panel, Feb. 8, 2022, Total pp. 9.
Dr. Gianluca Ambrosetti et al., "Cement Production", Energy Storage for Manufacturing and Industrial Decarbonization Workshop "Energy StorM", Feb. 8, 2022, Total pp. 10.
Dr. Jeffrey Goldmeer, "Power to Gas: Hydrogen for Power Generation Fuel Flexible Gas Turbines as Enablers for a Low or Reduced Carbon Energy Ecosystem," GE Power, Feb. 2019, 19 pages.
Echogen, "CO2-Based Pumped-Thermal Energy Storage Technical Overview & Status", Echogen Power System, Total pp. 20, Aug. 10-11, 2021.
Elizabeth Endler, "Energy Storage for Manufacturing Petrochemical Industry Perspective", Feb. 8, 2022, "Energy StorM" Workshop, US Department of Energy, Total pp. 14.
Elliott Group, "Materials for Hydrogen Compression", Thermo-Mechanical-Chemical Energy Storage Workshop, Elliott, Aug. 10-11, 2021, Total pp. 25.
Emiliano Bellini, "Long-duration thermal storage system based on silica sand", pv magazine International, Nov. 5, 2021, Total pp. 6.
Emiliano Bellini, "Storing wind, solar power with silica sands", pv magazine International, Sep. 1, 2021, Total pp. 10.
Fakhroleslam, Mohammad, et al., "Thermal/catalytic cracking of hydrocarbons for the production of olefins; a state-of-the-art review III: Process modeling and simulation", Elsevier, www.elsevier.com/locate/fuel, Fuel 252 (2019) 553-566, in 14 pages.
GE Energy Storage Unit RSU-4000, Modular, Scalable Energy Storage Solution for Utility-Scale Applications; www/ge.com/energystorage; 2020, 1 page.
Gregory C Staple, "California's Grid Geeks: Flattening the 'duck curve'", Jan. 25, 2017, www.greenbiz.com, Total Page Count 9.
Grid Energy Storage, U.S. Department of Energy, Dec. 2013, Total pp. 67.
Haisheng Chen et al., "Progress in electrical energy storage system: A critical review", Progress in Natural Science, vol. 19, Issue 3, Mar. 10, 2009, pp. 291-312, Total pp. 22.
Hamish Andrew Miller, et al. "Green hydrogen from anion exchange membrane water electrolysis: a review of recent developments in critical materials and operating conditions," rsc.li/sustainable-energy; DOI: 10.1039/c9se01240k; Received Dec. 14, 2019; Accepted Mar. 4, 2020; 20 pages.
Heber Sugo, "Miscibility gap alloys with inverse microstructures and high thermal conductivity for high energy density thermal storage applications", Applied Thermal Engineering, vol. 51, Issues 1-2, Mar. 2013, pp. 1345-1350, Total pp. 6.
Hélder Da Silva, "Energy Storage for Manufacturing and Industrial Decarbonization Workshop "Energy StorM"", Feb. 8, 2022, Total pp. 11.
Hitesh Bindra et al., "Sliding flow method for exergetically efficient packed bed thermal storage", Applied Thermal Engineering, vol. 64, Issues 1-2, Mar. 2014, pp. 201-208, Total pp. 8.
Hitesh Bindra et al., "Thermal analysis and exergy evaluation of packed bed thermal storage systems", Applied Thermal Engineering, vol. 52, Issue 2, Apr. 15, 2013, pp. 255-263, Total pp. 9.
"How thermal power plants can benefit from the energy transition", The Future of Energy 2019, Siemens Gamesa Renewable Energy, 10 pages.
Ilievski D, "New Two-Stage Calcination Technology", Proceedings of the 9th International Alumina Quality Workshop, Alcoa World Alumina, Technology Delivery Group, Western Australia, 2012, Total pp. 7.
Industrial Decarbonization using Electric Thermal Energy Storage (ETES), Jan. 25, 2022, Total pp. 11.
International Search Report mailed on Sep. 14, 2022 for International Application No. PCT/US2021/061041, 41 pages.
International Search Report and Written Opinion mailed on Mar. 1, 2024 for International Application No. PCT/US2023/034488, 14 pages.
International Search Report and Written Opinion mailed on May 17, 2024 for International Application No. PCT/US2023/085826, 14 pages.
International Search Report and Written Opinion mailed on Aug. 23, 2024 for International Application No. PCT/US2024/024158, 9 pages.
International Search Report and Written Opinion mailed on Dec. 20, 2024 for International Application No. PCT/US2024/024156, 29 pages.
Jaume Gasia et al., "Review on system and materials requirements for high temperature thermal energy storage. Part 1: General requirements", Renewable and Sustainable Energy Reviews, vol. 75, Aug. 2017, pp. 1320-1338, Total pp. 19.
Jay Fitzgerald, "Bioenergy and Chemical Energy Storage", Energy Storage for Manufacturing & Industrial Decarbonization Workshop, Feb. 8-9, 2022, Total pp. 6.
Jeff Moore, "Development of sCO2 Turbomachinery and its Application to Energy Storage", Thermal Mechanical-Chemical-Energy-Storage Workshop, Aug. 10-11, 2021, San Antonio, TX, Total pp. 41.
Jeff Moore, "Oxygen Storage Incorporated into the Allam OxyFuel Power Cycle", Southwest Research Institute, Total pp. 8, Aug. 10-11, 2021.
Ji, Huichao, et al., "Electricity Consumption Prediction of Solid Electric Thermal Storage with a Cyber-Physical Approach", Energies 2019, 12, 47441 doi: 10.3390/en12244744, www.mdpi.com/journal/energies, published on Dec. 12, 2019, in 18 pages.
Joe Cresko, "Energy Storage for Manufacturing", Energy Storage for Manufacturing & Industrial Decarbonization Workshop, Feb. 8-9, 2022, Total pp. 11.
Joe Paladino, "Transformation of the Electric Grid", Energy StorM Workshop, Feb. 4, 2022, Total pp. 5.
Joe Stekli, "LCRI Update TMCES 2021", Low-Carbon Resources Initiative, Electric Power Research Institute, Aug. 2021, Total pp. 31.
Joshua Schmitt, "Development of An Advanced Hydrogen Energy Storage System Using Aerogel In A Cryogenic Flux Capacitor (CFC)", Southwest Research Institute, Aug. 10, 2021, Total pp. 8.
Lion Hirth, "The market value of variable renewables: The effect of solar wind power variability on their relative price", Energy Economics, vol. 38, Jul. 2013, pp. 218-236, Total pp. 19.
Lion Hirth, "The Optimal Share of Variable Renewables: How the Variability of Wind and Solar Power affects their Welfare-optimal Deployment", The Energy Journal, vol. 36, No. 1, p. 149-184, (2015). Total pp. 36.
Lori Schaefer-Weaton, "Solar & Battery Energy Solution Agri-Industrial Plastics Co.", Agri-Industrial Plastics Company, Feb. 2022, Total pp. 12.
Luisa F Cabeza, "Advances in Thermal Energy Storage Systems Methods and Applications", Woodhead Publishing Series in Energy, No. 66, 2015, Total pp. 592.
M Gajendiran et al., "Application of Solar Thermal Energy Storage for Industrial Process Heating", Advanced Materials Research, vols. 984-985, Jul. 2014, Total pp. 7.
Marc Medrano et al., "State of the art on high-temperature thermal energy storage for power generation. Part 2-Case studies", Renewable and Sustainable Energy Reviews, vol. 14, Issue 1, Jan. 2010, pp. 56-72, Total 17.
Mathieu Hubert, "Lecture 3: Basics of industrial glass melting furnaces", IMI-NFG Course in Processing of Glass, Spring 2015, Total pp. 75.

(56) References Cited

OTHER PUBLICATIONS

Mecys Palsauskas, et al.: "Device ensuring effective usage of photovoltaics for water heating", Electrical Engineering, 101 (1), 189-202, Apr. 8, 2019 (Apr. 8, 2019), DOI: 10.1007/s00202-019-00766-0.
Michael Pesin, "The Office of Electricity Grid Modernization R&D Portfolio", Aug. 2, 2021, Total pp. 18.
Mike Gravely, "The Role of Energy Storage in Helping California Meet the State's Future Zero Carbon Energy Goals", Energy Research and Development Division, California, 2021, Total pp. 23.
Natalie Smith et al., "Integration of Pumped Heat Energy Storage with a Fossil-Fired Power Plant", U.S. Department of Energy, 2021, Total pp. 6.
Office Action in U.S. Appl. No. 17/650,519 mailed Apr. 20, 2022, 10 pages.
Office of Fossil Energy and Carbon Management, "U.S. Department of Energy Selects 12 Projects to Improve Fossil-Based Hydrogen Production, Transport, Storage and Utilization", dated Jul. 7, 2021, in 8 pages.
PCT; Invitation to Pay Additional Fees issued in International Patent Application No. PCT/US2021/061041; mailed Mar. 24, 2022; 21 Pages.
Pintail Power LLC, "Liquid Air Combined Cycle Hybrid Energy Storage", Pintail Power LLC, TMCES Workshop, Aug. 10-11, 2021, San Antonio, TX, Total pp. 12.
R. B. Laughlin, "Variable Blading in Closed-Cycle Brayton Energy Storage", TMCES, Aug. 10, 2021, San Antonio, Total pp. 26.
Rainer Kurz, "Hydrogen Pipelines & Storage", Mar. 8, 2021, Total pp. 16.
Reply to Communication Under Rule 71(3) EPC, received in corresponding EP App. No. 21 843 808.3, submitted May 6, 2024, in 9 pages.
Revterra, "Revterra Company Overview", TMCES 2021, Total pp. 14.
Reyad Sawafta, "Thermal Energy Storage—Cold Storage", Energy Storage for Manufacturing and Industrial Decarbonization Workshop, Feb. 9, 2022, Total pp. 11.
Richard Brody, "Powering the Carbon-Free Electric Future, Modular Geomechanical Pumped Storage (GPS)", Quidnet Energy, 3rd TMCES—Storage Deployment Panel, Aug. 11, 2021, Total pp. 7.
Richard T. Ibekwe, "Induction Heating of Firebricks for the Large-Scale Storage of Nuclear and Renewable Energy", Massachusetts Institute of Technology, Jun. 2018, Total pp. 40.
Robert J. Krane, "A second law analysis of a thermal energy storage system with Joulean heating of the storage element", American Society of Mechanical Engineers, Winter Annual Meeting, Miami Beach, Florida, USA, Nov. 17-21, 1985, Total pp. 10.
Russ Weed, "Market Needs & Technology Overview", Thermal-Mechanical-Chemical Energy Storage Workshop—Storage Deployment, Aug. 11, 2021, Total pp. 20.
S. W. Sucech et al., "Alcoa Pressure Calcination Process for Alumina", Light Metals 1986, R.E. Miller, 669-674, Total pp. 6.
Sakakibara, Reyu, et al., "Practical emitters for thermophotovoltaics: a review",Journal of Photonics for Energy, vol. 9, Issue 3, 032713 (Feb. 2019), https://doi.org/10.1117/1.JPE.9.032713, in 38 pages.
Sanjoy Banerjee, "Energy Storage to Decarbonize the Industrial Sector Through Direct Electrification", Energy Storage for Manufacturing and Industrial Decarbonization Workshop, Feb. 8, 2022, Total pp. 9.
Scott Hume, "Mid-Duration Energy Storage (MDES) Benefits and Challenges", 3rd TMCES Workshop, Aug. 10, 2021, Total pp. 11.
Sempra Energy Utility, "SoCalGas", Total pp. 6, Oct. 2021.
Sharadga, Hussein, et al., "A hybrid PV/T and Kalina cycle for power generation", Int J Energy Res. 2018;42:4817-4829, https://doi.org/10.1002/er.4237, dated Sep. 7, 2018.
Shaun Sullivan, "Reversible Counter-Rotating Turbomachine to Enable Brayton-Laughlin Cycle", 3rd Thermal-Mechanical-Chemical Energy Storage Workshop, Aug. 10, 2021, San Antonio TX, Total pp. 7.
Siemens AG, "Compressed Air Energy Storage (CAES)", 3rd Thermal-Mechanical-Chemical Energy Storage Workshop, Siemens Energy, Aug. 2021, Total pp. 17.
Siemens Gamesa, "Electric Thermal Energy Storage (ETES)—Industrial Decarbonization", Siemens Gamesa Renewable Energy, 2020, Total pp. 9.
Song, Jian, et al., "Combined supercritical CO2 (SCO2) cycle and organic Rankine cycle (ORC) system for hybrid solar and geothermal power generation: Thermoeconomic assessment of various configurations", (Year: 2021), in 16 pages.
Soteris Kalogirou, "The potential of solar industrial process heat applications", Applied Energy, vol. 76, Issue 4, Dec. 2003, pp. 337-361, Total pp. 25.
Steffes, ThermElect Hydronic, Demand-Free, Off-Peak Heating, May 2020, Total pp. 2.
Stefica Nicol Bikes, "Australian engineers patent thermal block to store renewable energy", www.reuters.com, Oct. 26, 2021, Total pp. 6.
Storworks Power, 3rd Thermal-Mechanical-Chemical Energy Storage Workshop, Aug. 10, 2021, Total pp. 8.
Swagelok Energy Advisors Inc, "Steam Quality—Plant Operations Require A High Steam Quality", Steam Systems Best Practices, Document No. 23, 2009, Total pp. 3.
T. Fiedler et al., "Thermal capacitors made from Miscibility Gap Alloys (MGAs)", WIT Transactions on Ecology and The Environment, vol. 186, 2014, Total pp. 8.
Third Party Objections raised in corresponding EP App. No. 21 843 808.3, dated Apr. 30, 2024, with English Translation, in 8 pages.
Thomas A. Buscheck, "Hybrid-energy technology enabled by heat storage and oxy- combustion for power and industrial-heat applications with near-zero or negative CO2 emissions", Thermal-Mechanical-Chemical Energy Storage Workshop, San Antonio, Texas, Aug. 10, 2021, Total pp. 22.
Timothy C. Allison, "Thermal-Mechanical-Chemical Energy Storage Technology Overview and Research Activities", Southwest Research Institute, Aug. 9, 2021, Total pp. 22.
Todd Brix, "Converting Carbon. Storing Energy", Richland, Washington U.S.A., Feb. 9, 2022, Total pp. 13.
Tony Bowdery et al., "Heat Exchangers For Thermal Energy Storage: Challenges And Mitigation", Meggitt, Aug. 2021, Total pp. 20.
Torbjörn Lindquist, "Powering the evolution of a renewable society, by redefining energy infrastructure", Azelio, Feb. 7, 2022, Total pp. 10.
Travis Mcling et al., " Dynamic Earth Energy Storage: Grid Scale Energy Storage using Planet Earth as a Thermal Battery (RTES)", Feb. 2022, Total pp. 7.
Trevor Brown, "Ammonia: the other hydrogen", Energy Storage for Manufacturing and Industrial Decarbonization Workshop "Energy StorM", Feb. 9, 2022, Total pp. 13.
Veera Gnaneswar Gude, "Energy storage for desalination processes powered by renewable energy and waste heat sources", Applied Energy, vol. 137, Jan. 1, 2015, pp. 877-898, Total pp. 22.
Vishal Sardeshpande, "Performance analysis for glass furnace regenerator", Applied Energy, vol. 88, Issue 12, Dec. 2011, pp. 4451-4458, Total pp. 8.
Whitlock, "NREL scientists partnering with Antora Energy and MIT on TPV projects" Renewable Energy Magazine Dec. 10, 2021, https://www.renewableenergymagazine.com/pv_solar/nrel-scientists-partnering-with-antoraenergy-and-20211210.
Written Opinion of the International Searching Authority mailed on Sep. 14, 2022 for PCT/US2021/061041, 26 pages.
Zhao, Haichuan, et al., "Thermal Calculation and Experimental Investigation of Electric Heating and Solid Thermal Storage System", Energies 2020, 13, 5241; doi:10.3390/en13205241, www.mdpi.com/journal/energies, published on Oct. 9, 2020, in 20 pages.
Zhou et al., "Highly Conductive Porous Graphene/Ceramic Composites for Heat Transfer and Thermal Energy Storage," Adv. Funct. Mater., 2013, 23, pp. 2263-2269.
International Search Report and Written Opinion mailed on Oct. 16, 2025 for International Application No. PCT/US2025/036518, 13 pages.

(56) References Cited

OTHER PUBLICATIONS

International Search Report and Written Opinion mailed on Oct. 21, 2025 for International Application No. PCT/US2025/026289, 19 pages.

* cited by examiner

THERMAL ENERGY STORAGE SYSTEM WITH HIGH EFFICIENCY HEATER CONTROL

CROSS-REFERENCE TO RELATED APPLICATIONS

This application claims priority to the following:

U.S. Provisional Patent Application No. 63/651,851 filed on May 24, 2024.

The following patent applications and patent are directed to related technologies:

U.S. patent application Ser. No. 18/633,425 filed on Apr. 11, 2024;

U.S. patent application Ser. No. 17/537,407 (filed Nov. 29, 2021; issued as U.S. Pat. No. 11,603,776 on Mar. 14, 2023); and International Patent Application No.: PCT/US2021/061041 (filed Nov. 29, 2021).

All of the foregoing applications are incorporated herein by reference in their entirety for all purposes.

BACKGROUND

Technical Field

The present disclosure relates to thermal energy storage and utilization systems. More particularly, the present disclosure relates to an energy storage system that stores electrical energy in the form of thermal energy, which can be used for the supply of hot air, nitrogen, argon, carbon dioxide ($CO_2$), steam, process gas, inert gas, hydrogen, or other heated fluids, for various applications including the supply of heat for power generation. More specifically, the present disclosure relates to implementing heater controls that improve efficiency of the TES system.

Related Art

I. Thermal Energy Systems

A. Variable Renewable Electricity

The combustion of fossil fuels has been used as a heat source in thermal electrical power generation to provide heat and steam for uses such as industrial process heat. The use of fossil fuels has various problems and disadvantages, however, including global warming and pollution. Accordingly, there is a need to switch from fossil fuels to clean and sustainable energy.

Variable renewable electricity (VRE) sources such as solar power and wind power have grown rapidly, as their costs have reduced as the world moves towards lower carbon emissions to mitigate climate change. But a major challenge relating to the use of VRE is, as its name suggests, its variability. The variable and intermittent nature of wind and solar power does not make these types of energy sources natural candidates to supply the continuous energy demands of electrical grids, industrial processes, etc. Accordingly, there is an unmet need for storing VRE to be able to efficiently and flexibly deliver energy at different times.

Moreover, the International Energy Agency has reported that the use of energy by industry includes the largest portion of world energy use, and that three-quarters of industrial energy is used in the form of heat, rather than electricity. Thus, there is an unmet need for lower-cost energy storage systems and technologies that utilize VRE to provide industrial process energy, which may expand VRE and reduce fossil fuel combustion.

B. Storage of Energy as Heat

Thermal energy in industrial, commercial, and residential applications may be collected during one time period, stored in a storage device, and released for the intended use during another period. Examples include the storage of energy as sensible heat in tanks of liquid, including water, oils, and molten salts; sensible heat in solid media, including rock, sand, concrete and refractory materials; latent heat in the change of phase between gaseous, liquid, and solid phases of metals, waxes, salts and water; and thermochemical heat in reversible chemical reactions which may absorb and release heat across many repeated cycles; and media that may combine these effects, such as phase-changing materials embedded or integrated with materials which store energy as sensible heat. Thermal energy may be stored in bulk underground, in the form of temperature or phase changes of subsurface materials, in contained media such as liquids or particulate solids, or in self-supporting solid materials.

Electrical energy storage devices such as batteries typically transfer energy mediated by a flowing electrical current. Some thermal energy storage devices similarly transfer energy into and out of storage using a single heat transfer approach, such as convective transfer via a flowing liquid or gas heat transfer medium. Such devices use "refractory" materials, which are resistant to high temperatures, as their energy storage media. These materials may be arranged in configurations that allow the passage of air and combustion gases through large amounts of material.

Some thermal energy systems may, at their system boundary, absorb energy in one form, such as incoming solar radiation or incoming electric power, and deliver output energy in a different form, such as heat being carried by a liquid or gas. But thermal energy storage systems should also be able to deliver storage economically. For sensible heat storage, the range of temperatures across which the bulk storage material—the "storage medium"—can be heated and cooled is an important determinant of the amount of energy that can be stored per unit of material. Thermal storage materials are limited in their usable temperatures by factors such as freezing, melting, softening, boiling, or thermally driven decomposition or deterioration, including chemical and mechanical effects.

Further, different uses of thermal energy—different heating processes or industrial processes—require energy at different temperatures. Electrical energy storage devices, for example, can store and return electrical energy at any convenient voltage and efficiently convert that voltage up or down with active devices. On the other hand, the conversion of lower-temperature heat to higher temperatures is intrinsically costly and inefficient. Accordingly, a challenge in thermal energy storage devices is the cost-effective delivery of thermal energy with heat content and at a temperature sufficient to meet a given application.

Some thermal energy storage systems store heat in a liquid that flows from a "cold tank" through a heat exchange device to a "hot tank" during charging, and then from the hot tank to the cold tank during discharge, delivering relatively isothermal conditions at the system outlet during discharge. Systems and methods to maintain sufficient outlet temperature while using lower-cost solid media are needed.

Thermal energy storage systems generally have costs that are primarily related to their total energy storage capacity (how many MWh of energy are contained within the system) and to their energy transfer rates (the MW of instantaneous power flowing into or out of the energy storage unit at any given moment). Within an energy storage unit, energy is transferred from an inlet into a storage medium, and then transferred at another time from the storage medium to an outlet. The rate of heat transfer into and out of the storage medium is limited by factors including the heat conductivity and capacity of the medium, the surface area across which heat is transferring, and the temperature difference across that surface area. High rates of charging are enabled by high temperature differences between the heat source and the storage medium, high surface areas, and the use of a storage medium with high heat capacity and/or high thermal conductivity.

Each of these factors can add significant cost to an energy storage device. For example, larger heat exchange surfaces commonly require 1) larger volumes of heat transfer fluids, and 2) larger surface areas in heat exchangers, both of which are often costly. Higher temperature differences require heat sources operating at relatively higher temperatures, which may cause efficiency losses (e.g. radiation or convective cooling to the environment, or lower coefficient of performance in heat pumps) and cost increases (such as the selection and use of materials that are durable at higher temperatures). Media with higher thermal conductivity and heat capacity may also require selection of costly higher-performance materials or aggregates.

Another challenge of systems storing energy from VRE sources relates to rates of charging. A VRE source, on a given day, may provide only a small percentage of its energy during a brief period of the day, due to prevailing conditions. For an energy storage system that is coupled to a VRE source and that is designed to deliver continuous output, all the delivered energy should be absorbed during the period when incoming VRE is available. As a result, the peak charging rate may be some multiple of the discharge rates (e.g., 3-5×), for instance, in the case of a solar energy system, if the discharge period (overnight) is significantly longer than the charge period (during daylight). In this respect, the challenge of VRE storage is different from, for example, that of heat recuperation devices, which typically absorb and release heat at similar rates. For VRE storage systems, the design of units that can effectively charge at high rates is important and may be a higher determinant of total system cost than the discharge rate.

C. Thermal Energy Storage Problems and Disadvantages

The above-described approaches have various problems and disadvantages. Earlier systems do not take into account several critical phenomena in the design, construction, and operation of thermal energy storage systems, and thus does not facilitate such systems being built and efficiently operated. More specifically, current designs fail to address "thermal runaway" and element failure due to non-uniformities in thermal energy charging and discharging across an array of solid materials, including the design of charging, discharging, and unit controls to attain and restore balances in temperature across large arrays of thermal storage material.

Thermal energy storage systems with embedded radiative charging and convective discharging are in principle vulnerable to "thermal runaway" or "heat runaway" effects. The phenomenon may arise from imbalances, even small imbalances, in local heating by heating elements and in cooling by heat transfer fluid flow. The variations in heating rate and cooling rate, unless managed and mitigated, may lead to runaway temperatures that cause failures of heaters and/or deterioration of refractory materials. Overheating causes early failures of heating elements and shortened system life. In Stack, for example, the blocks closest to the heating wire are heated more than the blocks that are further away from the heating wire. As a result, the failure rate for the wire is likely to increase, reducing heater lifetime.

One effect that further exacerbates thermal runaway is the thermal expansion of air flowing in the air conduits. Hotter air expands more, causing a higher outlet velocity for a given inlet flow, and thus a higher hydraulic pressure drop across the conduit, which may contribute to a further reduction of flow and reduced cooling during discharge. Thus, in successive heating and cooling cycles, progressively less local cooling can occur, resulting in still greater local overheating.

The effective operation of heat supply from thermal energy storage relies upon continuous discharge, which is a particular challenge in systems that rely upon VRE sources to charge the system. Solutions are needed that can capture and store that VRE energy in an efficient manner and provide the stored energy as required to a variety of uses, including a range of industrial applications, reliably and without interruption.

Previous systems do not adequately address problems associated with VRE energy sources, including variations arising from challenging weather patterns such as storms, and longer-term supply variations arising from seasonal variations in VRE generation. In this regard, there is an unmet need in the art to provide efficient control of energy storage system charging and discharging in smart storage management. Current designs do not adequately provide storage management that considers a variety of factors, including medium-term through short-term weather forecasts, VRE generation forecasts, and time-varying demand for energy, which may be determined in whole or in part by considerations such as industrial process demand, grid energy demand, real-time electricity prices, wholesale electricity market capacity prices, utility resource adequacy value, and carbon intensity of displaced energy supplies. A system is needed that can provide stored energy to various demands that prioritizes by taking into account these factors, maximizing practical utility and economic efficiencies.

There are a variety of unmet needs relating generally to energy, and more specifically, to thermal energy. Generally, there is a need to switch from fossil fuels to clean and sustainable energy. There is also a need to store VRE to deliver energy at different times in order to help meet society's energy needs. There is also a need for lower-cost energy storage systems and technologies that allow VRE to provide energy for industrial processes, which may expand the use of VRE and thus reduce fossil fuel combustion. There is also a desire to maintain sufficient outlet temperature while using lower-cost solid media.

Still further, there is a need to design VRE units that can be rapidly charged at low cost, supply dispatchable, continuous energy as required by various industrial applications despite variations in VRE supply, and that facilitate efficient control of charging and discharging of the energy storage system.

II. Storage of Intermittent Energy

Fossil fuels have driven the world economy since the industrial revolution; however, mankind has discovered that not only is there a limited supply of these energy resources, but also that the combustion of fossil fuels to extract their energy produces greenhouse gases and other pollutants that threaten planet-wide ecosystems. Specifically, such systems are inherently inefficient in their use of the energy locked up in chemical bonds because they emit innumerable tons of hot combustion gases out smokestacks into our atmosphere, directly causing global warming, indirectly causing global warming through the effects of greenhouse gas emissions on the increased absorption of sunlight by planet Earth, as well as the effects of the pollutants' contribution to the degradation of our planet through, for example, the washing of the Earth's various ecosystems in acid rain.

Energy sources that address this problem, such as solar energy, wind energy, and tidal energy are being developed to meet our need for renewable energy sources that do not generate these harmful greenhouse gases. One drawback that renewable energy sources have is that they are of an intermittent nature. The sun does not always shine; the wind does not always blow; tides are not always flowing. This has prevented these technologies from becoming replacements for fossil fueled energy sources, since industry requires power on demand, 24 hours a day, 365 days a year.

Therefore, what is needed is a way to store the intermittent energy that renewable energy sources provide in a closed loop to meet the constant power demands of industry without expelling heat and pollutants to the atmosphere. This has led to the development of green energy storage solutions, as well as the systems and methods for heat storage and extraction from structured solid blocks in thermal energy storage units as described herein.

One hurdle that lies between the conception and initial development of thermal storage solutions and their actual implementation is the interfacing of such solutions with existing industrial equipment to make use of existing assets and infrastructure. Consequently, what is needed are systems for the modularization of such thermal energy storage units that may be combined in various fashions to provide for customized solutions that meet the individual needs for retrofitting such fossil fuel fired power systems. Furthermore, there is a great need to enable the evaluation of thermal energy storage units as a green energy alternative to existing fuel fired boiler systems without redesigning and rebuilding existing industrial infrastructure. Along these lines, what is desperately needed are systems that allow for easily switching between fossil fuel energy sources and variable renewable electricity sources to evaluate the latter as replacements for existing fossil fuel fired energy sources. This would greatly help achieve the worldwide goals set forth in the Paris Climate Accord, in particular a 45% reduction in greenhouse gas emissions by 2030, with a net zero emission goal target set for 2050. In particular, systems and methods for the coupling of one or more thermal energy storage units to fuel fired boiler systems is needed, along with control systems that coordinate the operation of systems containing multiple thermal energy storage units. This coupling of two completely different energy sources allows for reversibly evaluating this new sustainable technology for the possible retrofitting or replacement of the fossil fuel based systems with a green energy supply, while retaining much of the capital equipment that is already paid for and in service.

III. Seismic Stability of Stored Thermal Energy Systems

Thermal energy storage (TES) systems can be deployed to solve energy storage issues at various locations around the world, including those in seismically active regions. Because thermal storage mediums can sometimes be in the form of heavy blocks of refractory materials, designing the TES system with features to secure those blocks and withstand seismic events will allow for greater availability of the TES system throughout the world.

SUMMARY

The example implementations advance the art of thermal energy storage and enable the practical construction and operation of high-temperature thermal energy storage (TES) systems that can charge by VRE, store energy in storage media, and deliver high-temperature heat. This Section of the Summary relates to the disclosure as it appears in U.S. patent application Ser. No. 17/668,333 (U.S. Pat. No. 11,603,776).

Aspects of the example implementations relate to a system for thermal energy storage, including an input (e.g., electricity from a variable renewable electricity (VRE) source), a container having sides, a roof and a lower platform, a plurality of vertically oriented thermal storage units (TSUs), inside the container, the TSUs each including a plurality of stacks of blocks and heaters attached thereto, each of the heaters being connected to the input electricity via switching circuitry, an insulative layer interposed between the plurality of TSUs, the roof and at least one of the sides, a duct formed between the insulative layer and a boundary formed by the sides, an inner side of the roof and the lower platform of the container, a blower that blows relatively cooler fluid such as air or another gas (e.g. $CO_2$) along the flow path, an output (e.g., hot air at prescribed temperature to industrial application), a controller that controls and co-manages the energy received from the input and the hot air generated at the output based on a forecast associated with an ambient condition (e.g., season or weather) or a condition (e.g., output temperature, energy curve, etc.). The exterior and interior shapes of the container may be rectangular, cylindrical (in which case "sides" refers to the cylinder walls), or other shapes suitable to individual applications.

The terms air, fluid and gas are used interchangeably herein to refer to a fluid heat transfer medium of any suitable type, including various types of gases (air, $CO_2$, oxygen, nitrogen, argon, other inert gases, and other gases, alone or in combination), and when one is mentioned, it should be understood that the others can equally well be used. Thus, for example, "air" can be any suitable fluid or gas or combinations of fluids or gases.

Thermal energy storage (TES) systems according to the present designs can advantageously be integrated with or coupled to steam generators, including heat recovery steam generators (HRSGs) and once-through steam generators (OTSGs). The terms "steam generator", "HRSG", and "OTSG" are used interchangeably herein to refer to a heat exchanger that transfers heat from a first fluid into a second fluid, where the first fluid may be air circulating from the TSU and the second fluid may be water (being heated and/or boiled), oil, salt, air, $CO_2$, or another fluid. In such implementations, the heated first fluid is discharged from a TES unit and provided as input to the steam generator, which extracts heat from the discharged fluid to heat a second fluid, including producing steam, which heated second fluid may be used for any of a variety of purposes (e.g., to drive a turbine to produce shaft work or electricity). After passing through a turbine, the second fluid still contains significant heat energy, which can be used for other processes. Thus, the TES system may drive a cogeneration process. The first fluid, upon exiting the steam generator, can be fed back as input to the TES, thus capturing waste heat to effectively preheat the input fluid. Waste heat from another process may also preheat input fluid to the TES.

According to another aspect, a dynamic insulation system include a container having sides, a roof and a lower platform, a plurality of vertically oriented thermal storage units (TSUs) spaced apart from one another, an insulative layer interposed between the plurality of TSUs, the roof and at least one of the sides and floor, a duct formed between the insulative layer and a boundary formed by the sides, an inner side of the roof and the lower platform of the container, and a blower that blows unheated air along the air flow path, upward from the platform to a highest portion of the upper portion, such that the air path is formed from the highest portion of the roof to the platform, and is heated by the plurality of TSUs, and output from the TES apparatus. The unheated air along the flow path forms an insulated layer and is preheated by absorbing heat from the insulator.

This disclosure also describes implementations directed at components the reduce the overall cost of controlling heaters used in the TES system. One or more implementations herein also describe techniques for engaging or disengaging heating of various zones of thermal storage assemblage to maintain a desired thermal profile during different operating conditions.

In some implementations, the field and the TES are connected to the grid and the TES charges from the grid, following the grid output by software adjusted thyristors or by actuating switches to sequentially add switched circuits at 100% of power. These circuits can be adjusted to utilize 100% of the amount of power supplied to the grid by the field and purchase a small amount from the grid to maintain the charging when there are dips in output from the field.

In some implementations, the use of thyristors is eliminated and replaced in the charging load control by switches. The switches engage or disengage circuits sequentially increasing or decreasing the charging load in increments of 100% of the capacity of the respective circuit. If the field following is desired, it is slightly less precise with switch control of the charging circuits than with the thyristors, but that is offset by the ability to fully utilize all the power the field can provide to the grid.

In some implementations, the electronics housing may be a shipping container for only low voltage power control for pumps, fans, louvers, UPS, computer, instrumentation, and communication. The switches that replaced the thyristors, any fuses, and circuit breakers are on a skid outside in NEMA 3R enclosures. This allows an industrial electrician can enter and work on most of the electrical equipment requiring adjustment without having to have a MV license.

In some implementations, "passenger blocks" may be added without adjacent heaters and only heated convectively and by conduction more slowly than the thermal storage blocks with dedicated heater circuits. These storage blocks without dedicated heater circuits in turn discharge over a longer period and potentially extent the length of discharge at lower temperature. This also increases the ability to continue discharging air at usable temperatures longer maintaining the air flow and cooling any hot spots by convective cooling preheating the air before the heating by the "passenger blocks" after the last blocks in the TES with heaters. Optionally, these passenger blocks are larger in volume than the blocks with dedicated heater circuits. Optionally, these passenger blocks are located at the outlet end and/or inlet end of the assemblage of storage blocks. Optionally, some of these passenger blocks without dedicated heaters may be located in the assemblage, away from either the inlet end and/or outlet end of the assemblage.

In some implementations, by being connected to the grid when the field is not producing, it is possible to still fully charge from the grid and by real time power cost agreements, the charging can be optimized for low-cost power times which tend to be midday because of solar abundance and at night because of lower demand.

In some implementations, when the TES follows the solar field if it is depleted near morning and the electric price is neither the highest nor the lowest, it is possible to heat only the last blocks at the discharge end with grid power until there is less expensive power available after sunrise or later at midday for charging the TES at 100% of all circuits capacity with all switches closed. Likewise, if the TES is fully charged by heating only the first blocks on the inlet end the TES can remain fully charged while maintaining normal discharge operation until when the power is expensive or is not available after sundown. This optimizes the value of stored power and minimizes the cost of charging.

In some implementations, the movement in time of power in the charge or to maintain operation, discharge, when the cost of power is neither maximum nor minimum to extend the length of day at high discharge rates or to delay charging until the price is lower is accomplished by operating in "the 2 warm modes". By only closing the first and second or next to the last and last switches and suppling the discharge at normal rates with the TES full to wait for higher value power to discharge or if the TES is empty to wait for lower cost power to charge it is possible to maintain a higher discharge rate and a higher value per kW.

In one implementation, the operational method of heating only the front end or discharge end of the TES when the price of power from the grid is neither highest nor lowest, optimizes the charging or discharging. When fully charged it keeps the TES charged while discharging at normal rates to move the time of discharge to when the electricity is more expensive or after dark. It also keeps the TES discharged at normal rates until the power is available at cheaper cost as during the day when solar is abundant or at night when the demand is low.

Optionally, the use of charging just the first or last stacks of blocks also allows the discharge to be longer during the day than the discharge could be sustained for the storage capacity of the TES. When the TES is nearly empty the discharge temperature can be held at nearly normal by heating only the discharge blocks at the end of the day. When the TES is fully charged only the front end of the TES can be heated to allow the discharge to be normal without charging the main TES blocks more until the price of power is lower.

Optionally, systems and methods are provided for controlling electrical input into a thermal energy storage (TES) system, particularly in the context of variable and/or intermittent renewable energy sources such as solar and wind power. In some implementations, the system includes features for load-following control, phase balancing, switching configurations, and thermal management strategies to reduce capital and operational cost while enhancing system responsiveness and reliability.

Load-Following Control with Variable Renewable Inputs

In some implementations, the TES system is configured to receive electrical input from renewable energy sources whose output fluctuates rapidly over time. Such variability is especially pronounced in solar and wind generation. In some implementations, the system enables the load to closely follow the available power through dynamic modulation using either thyristors or staged mechanical switching. Precise load following is desired to prevent tripping of the renewable energy field, particularly when the TES system is directly coupled to a solar or wind array without significant grid buffering.

In some grid-connected configurations, the difference between available renewable power and system load is absorbed by the grid. However, this results in the use of utility-supplied electricity, which is typically more expensive. The disclosed system minimizes reliance on the grid by maintaining a buffer, typically around 5% less than the renewable input, to accommodate sudden reductions in source output (e.g., due to transient weather conditions). This enables highly efficient charging of the TES system using almost exclusively renewable electricity.

Elimination or Reduction of Thyristor Power Losses

Conventional systems employing thyristors for power modulation experience nontrivial energy losses, typically on the order of 1.5 W per ampere. For systems carrying current levels above 10,000 A, this results in substantial parasitic consumption. Some implementations of the disclosed system mitigates this loss by utilizing switches such as but not limited to synchronized three-phase mechanical switches in configurations that eliminate or significantly reduce the operational reliance on thyristors. In addition to reducing energy loss, this also lowers component cost and maintenance requirements.

Phase Balancing and Heater Circuit Redundancy

Some implementations may maintain balanced current loading across all three electrical phases is essential for compatibility with grid and customer equipment. The system employs synchronized three-phase switching to preserve phase balance. In the event of a single-phase heater circuit failure, redundancy is provided through selectively controlled single-phase switches in central TES zones. This configuration allows continued warm operation of the TES system while maintaining balanced loading across all three phases.

For example, if a three-phase switch includes a failed leg, the conventional approach would be to disable the entire switch, losing all three legs. Some implementations of the system is configured for selective deactivation of the failed leg while redistributing remaining operational circuits through auxiliary switches. This preserves inlet or outlet heating functionality necessary for thermal management and avoids complete circuit loss.

Incremental Load Switching for Grid Compliance

Power purchase agreements and grid interconnection contracts often specify limitations on the rate of load changes (e.g., in megawatts per minute). To comply with such constraints, some implementations of the system includes: multiple switches rated at different capacities, such as a set of eight lower-rated switches and two higher-rated switches; sequenced activation of these switches to incrementally increase or decrease system load; series-switching arrangements that connect two or more heater circuits in electrical series before switching them across the line, effectively reducing the per-switch load magnitude. These configurations enable fine-grained control over load ramping, even in systems without thyristor control, and ensure compliance with external contractual and electrical stability requirements.

Enhanced Heater Sizing for Dual-Function Zones

In some implementations, the TES system includes zones in which incoming air is simultaneously heated and used to store thermal energy. In one embodiment, the first six rows of thermal bricks perform this dual function. To address the increased energy demand in this region, the system assigns approximately double the power capacity to the switches controlling these zones. This ensures that, by the end of the charge cycle, the front sections of the TES have been adequately charged and preheated, reducing the thermal burden on downstream sections. Such a configuration is also applicable during low-cost power availability or warm standby operation, where only the inlet zone is heated to maintain the overall temperature of the TES system until higher renewable availability is achieved.

Single-Thyristor Load-Following Architecture

In another embodiment, the system includes a single thyristor device and multiple low-cost, no-load mechanical switches arranged downstream of the thyristor. Each switch connects a heater circuit to the main power bus. The operational sequence is as follows: All switches begin in an open state. The thyristor is ramped from zero output while connected to a selected mechanical switch. Once the thyristor reaches full output, the selected switch is closed under zero-load conditions. The thyristor is then disconnected and reset to zero before engaging the next switch. This implementation of the sequence enables the system to follow the renewable source output with high precision, matching both upward and downward changes in available power. Because the mechanical switches do not transfer load, their cost and maintenance requirements are significantly reduced. This architecture achieves the same functional performance as a system with a dedicated thyristor per switch but at a fraction of the capital and operating cost.

Modular E-House and External High-Voltage Components

Some implementations of the system further includes a modular design strategy that separates low-voltage and high-voltage components into different enclosures. Specifically: The main electrical house (e-house) contains only low-voltage systems (e.g., ≤480V), including control systems, instrumentation, and operating computers. This allows maintenance by general-purpose electricians and supports the use of standard 20-foot shipping containers; High-voltage components (e.g., 4160V switchgear, fuses, and optional thyristors) are housed in external, factory-assembled skids. These enclosures are prewired, compact (e.g., <8 feet wide), and installed as modular units in the field. This arrangement simplifies logistics, reduces installation cost, improves safety compliance, and eliminates the need for large on-site e-houses with restricted access.

Some implementations may include a "warm mode" of operation is used when the TES is nearly discharged but full-scale charging is not yet economical. In this mode, limited heating is applied to maintain system temperature until a lower-cost energy period becomes available. This may involve activating one or more heating circuits at either the inlet or outlet end of the TES, depending on the direction of flow and desired thermal distribution.

After full charging, the TES may enter a "maintain" mode, in which only the inlet-end heating circuits remain engaged to retain thermal energy until discharge is required or power pricing becomes favorable again. These keep-warm modes allow the system to defer full charging until energy prices are optimal, increasing overall economic efficiency.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF DRAWINGS

The accompanying drawings are included to provide a further understanding of the present disclosure and are incorporated in and constitute a part of this specification. The drawings illustrate example implementations of the present disclosure and, together with the description, serve to explain the principles of the present disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Aspects of the example implementations, as disclosed herein, relate to systems, methods, materials, compositions, articles, and improvements for a thermal energy storage system for power generation for various industrial applications.

I. Thermal Energy Storage System

This Section I of the Summary relates to the disclosure as it appears in U.S. Pat. No. 11,603,776, of which this application is a continuation-in-part.

U.S. Pat. No. 11,603,776 relates to the field of thermal energy storage and utilization systems and addresses the above-noted problems. A thermal energy storage system is disclosed that stores electrical energy in the form of thermal energy in a charging mode and delivers the stored energy in a discharging mode. The discharging can occur at the same time as charging; i.e., the system may be heated by electrical energy at the same time that it is providing a flow of convectively heated air. The discharged energy is in the form of hot air, hot fluids in general, steam, heated $CO_2$, heated supercritical $CO_2$, and/or electrical power generation, and can be supplied to various applications, including industrial uses. The disclosed implementations include efficiently constructed, long-service-life thermal energy storage systems having materials, fabrication, physical shape, and other properties that mitigate damage and deterioration from repeated temperature cycling.

Optionally, heating of the elements of the storage unit may be optimized, so as to store a maximum amount of heat during the charging cycle. Alternatively, heating of elements may be optimized to maximize heating element life, by means including minimizing time at particular heater temperatures, and/or by adjusting peak charging rates and/or peak heating element temperatures. Still other alternatives may balance these competing interests. Specific operations to achieve these optimizations are discussed further below.

Example implementations employ efficient yet economical thermal insulation. Specifically, a dynamic insulation design may be used either by itself or in combination with static primary thermal insulation. The disclosed dynamic insulation techniques provide a controlled flow of air inside the system to restrict dissipation of thermal energy to the outside environment, which results in higher energy storage efficiency.

System Overview as Disclosed in U.S. Pat. No. 11,603,776

Figure 1:
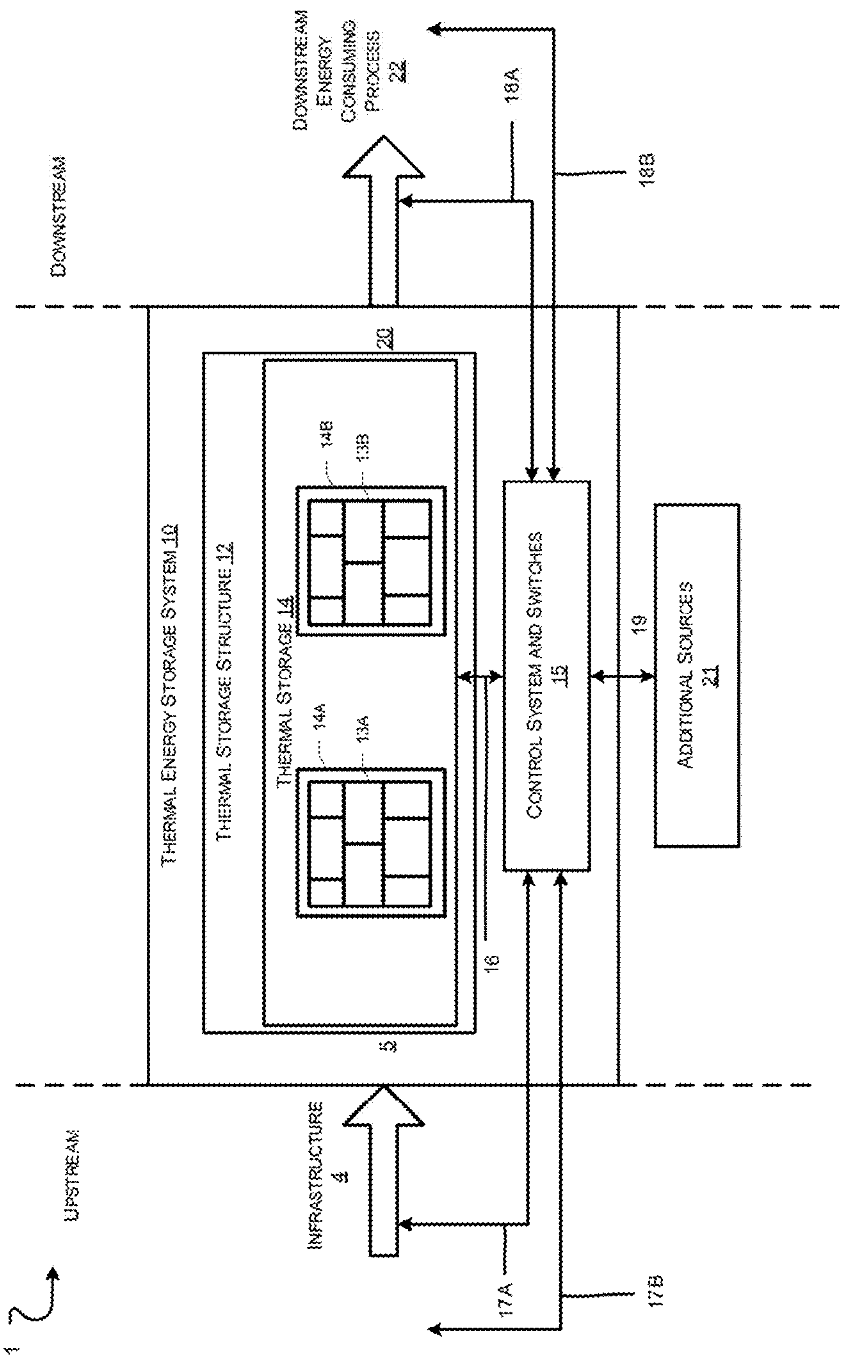
FIG. 1 illustrates a schematic diagram of the thermal energy storage system architecture according to the example implementations.

FIG. 1 is a block diagram of a system 1 that includes a thermal energy storage system 10, according to one implementation. In the implementation shown, thermal energy storage system 10 is coupled between an input energy source 2 and a downstream energy-consuming process 22. For ease of reference, components on the input and output sides of system 1 may be described as being "upstream" and "downstream" relative to system 10.

In the depicted implementation, thermal energy storage system 10 is coupled to input energy source 2, which may include one or more sources of electrical energy. Source 2 may be renewable, such as photovoltaic (PV) cell or solar, wind, geothermal, etc. Source 2 may also be another source, such as nuclear, natural gas, coal, biomass, or other. Source 2 may also include a combination of renewable and other sources. In this implementation, source 2 is provided to thermal energy storage system 10 via infrastructure 4, which may include one or more electrical conductors, commutation equipment, etc. In some implementations, infrastructure 4 may include circuitry configured to transport electricity over long distances; alternatively, in implementations in which input energy source 2 is located in the immediate vicinity of thermal energy storage system 10, infrastructure 4 may be greatly simplified. Ultimately, infrastructure 4 delivers energy to input 5 of thermal energy storage system 10 in the form of electricity.

The electrical energy delivered by infrastructure 4 is input to thermal storage structure 12 within system 10 through switchgear, protective apparatus and active switches controlled by control system 15. Thermal storage structure 12 includes thermal storage 14, which in turn includes one more assemblages (e.g., 14A, 14B) of a solid storage medium (e.g., 7B, 13A) configured to store thermal energy. These assemblages are variously referred to throughout this disclosure as "stacks," "arrays," and the like. These terms are intended to be generic and not connote any particular orientation in space, etc. In general, an array can include any material that is suitable for storing thermal energy and can be oriented in any given orientation (e.g., vertically, horizontally, etc.). Likewise, the solid storage medium within the assemblages may variously be referred to as thermal storage blocks, blocks, etc. In implementations with multiple arrays, the arrays may be thermally isolated from one another and are separately controllable, meaning that they are capable of being charged or discharged independently from one another. This arrangement provides maximum flexibility, permitting multiple arrays to be charged at the same time, multiple arrays to be charged at different times or at different rates, one array to be discharged while the other array remains charged, etc.

Thermal storage 14 is configured to receive electrical energy as an input. The received electrical energy may be provided to thermal storage 14 via resistive heating elements that are heated by electrical energy and emit heat, primarily as electromagnetic radiation in the infrared and visible spectrum. During a charging mode of thermal storage 14, the electrical energy is released as heat from the resistive heating elements, transferred principally by radiation emitted both by the heating elements and by hotter portions of the solid storage medium, and absorbed and stored in the solid storage medium within storage 14. When an array within thermal storage 14 is in a discharging mode, the heat is discharged from thermal storage structure 12 as output 20. As will be described, output 20 may take various forms, including a fluid such as hot air. (References to the use of "air" and "gases" within the present disclosure may be understood to refer more generally to a "fluid.") The hot air may be provided directly to a downstream energy consuming process 22 (e.g., an industrial application), or it may be passed through a steam generator (not shown) to generate steam for process 22.

Additionally, thermal energy storage system 10 includes a control system 15. Control system 15, in various implementations, is configured to control thermal storage 14, including through setting operational parameters (e.g., discharge rate), controlling fluid flows, controlling the actuation of electromechanical or semiconductor electrical switching devices, etc. The interface 16 between control system 15 and thermal storage structure 12 (and, in particular thermal storage 14) is indicated in FIG. 1. Control system 15 may be implemented as a combination of hardware and software in various implementations.

Control system 15 may also interface with various entities outside thermal energy storage system 10. For example, control system 15 may communicate with input energy source 2 via an input communication interface 17B. For example, interface 17B may allow control system 15 to receive information relating to energy generation conditions at input energy source 2. In the implementation in which input energy source 2 is a photovoltaic array, this information may include, for example, current weather conditions at the site of source 2, as well as other information available to any upstream control systems, sensors, etc. Interface 17B may also be used to send information to components or equipment associated with source 2.

Similarly, control system 15 may communicate with infrastructure 4 via an infrastructure communication interface 17A. In a manner similar to that explained above, interface 17A may be used to provide infrastructure information to control system 15, such as current or forecast VRE availability, grid demand, infrastructure conditions, maintenance, emergency information, etc. Conversely, communication interface 17A may also be used by control system 15 to send information to components or equipment within infrastructure 4. For example, the information may include control signals transmitted from the control system 15, that controls valves or other structures in the thermal storage structure $1_2$ to move between an open position and a closed position, or to control electrical or electronic switches connected to heaters in the thermal storage 14. Control system 15 uses information from communication interface 17A in determining control actions, and control actions may adjust closing or firing of switches in a manner to optimize the use of currently available electric power and maintain the voltage and current flows within infrastructure 4 within chosen limits.

Control system 15 may also communicate downstream using interfaces 18A and/or 18B. Interface 18A may be used to communicate information to any output transmission structure (e.g., a steam transmission line), while interface 18B may be used to communicate with downstream process 22. For example, information provided over interfaces 18A and 18B may include temperature, industrial application demand, current or future expected conditions of the output or industrial applications, etc. Control system 15 may control the input, heat storage, and output of thermal storage structure based on a variety of information. As with interfaces 17A and 17B, communication over interfaces 18A and 18B may be bidirectional—for example, system 10 may indicate available capacity to downstream process 22. Still further, control system 15 may also communicate with any other relevant data sources (indicated by reference numeral 21 in FIG. 1) via additional communication interface 19. Additional data sources 21 are broadly intended to encompass any other data source not maintained by either the upstream or downstream sites. For example, sources 21 might include third-party forecast information, data stored in a cloud data system, etc.

Thermal energy storage system 10 is configured to efficiently store thermal energy generated from input energy source 2 and deliver output energy in various forms to a downstream process 22. In various implementations, input energy source 2 may be from renewable energy and downstream process 22 may be an industrial application that requires an input such as steam or hot air. Through various techniques, including arrays of thermal storage blocks that use radiant heat transfer to efficiently store energy and a lead-lag discharge paradigm that leads to desirable thermal properties such as the reduction of temperature nonuniformities within thermal storage 14, system 10 may advantageously provide a continuous (or near-continuous) flow of output energy based on an intermittently available source. The use of such a system has the potential to reduce the reliance of industrial applications on fossil fuels.

Figure 2:
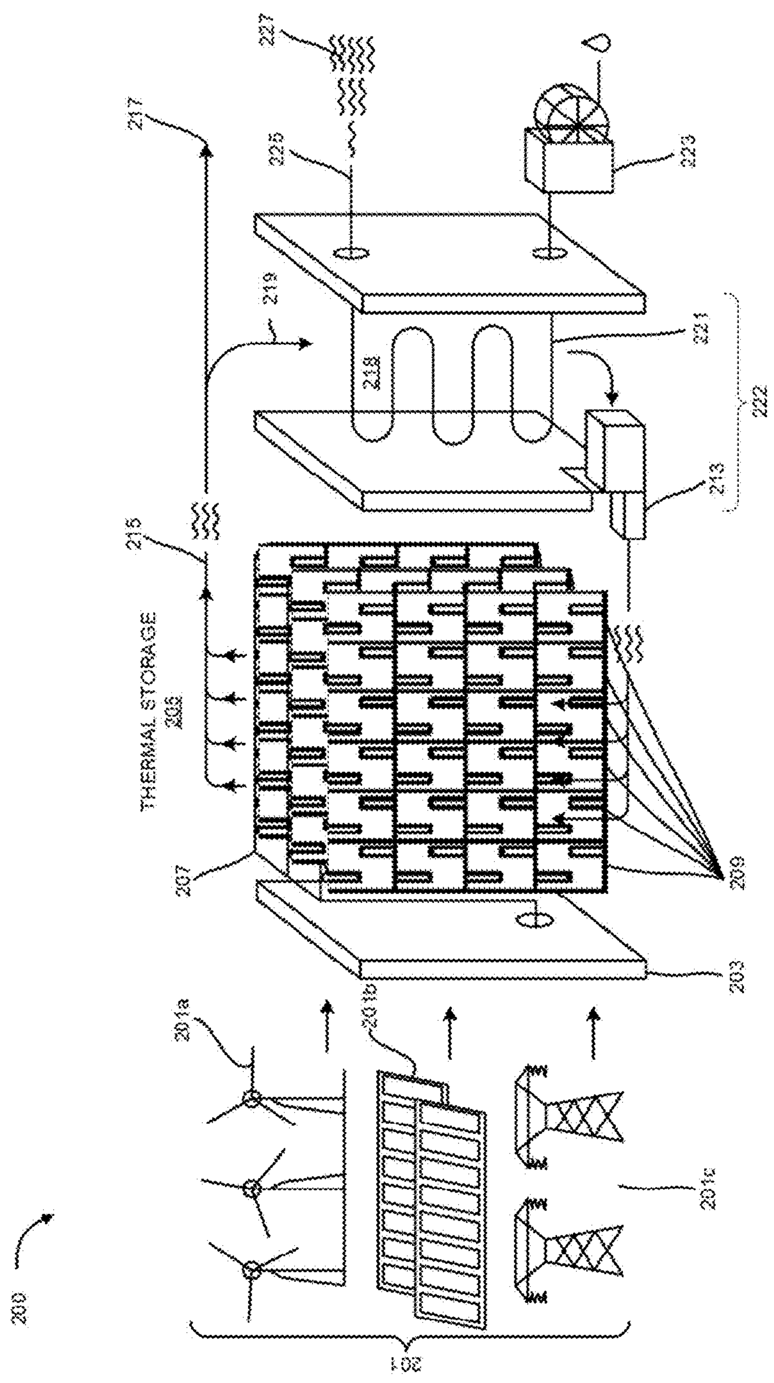
FIG. 2 illustrates a schematic diagram of a system according to the example implementations.

FIG. 2 provides a schematic view of one implementation of a system 200 for storing thermal energy, and further illustrates components and concepts just described with respect to FIG. 1. As shown, one or more energy sources 201 provide input electricity. For example, and as noted above, renewable sources such as wind energy from wind turbines 201*a*, solar energy from photovoltaic cells 201*b*, or other energy sources may provide electricity that is variable in availability or price because the conditions for generating the electricity are varied. For example, in the case of wind turbine 201*a*, the strength, duration and variance of the wind, as well as other weather conditions causes the amount of energy that is produced to vary over time. Similarly, the amount of energy generated by photovoltaic cells 201*b* also varies over time, depending on factors such as time of day, length of day due to the time of year, level of cloud cover due to weather conditions, temperature, other ambient conditions, etc. Further, the input electricity may be received from the existing power grid 201*c*, which may in turn vary based on factors such as pricing, customer demand, maintenance, and emergency requirements.

The electricity generated by source 201 is provided to the thermal storage structure within the thermal energy storage system. In FIG. 2, the passage of electricity into the thermal storage structure is represented by wall 203. The input electrical energy is converted to heat within thermal storage 205 via resistive heating elements 207 controlled by switches (not shown). Heating elements 207 provide heat to solid storage medium 209. Thermal storage components (sometimes called "blocks") within thermal storage 205 are arranged to form embedded radiative chambers. FIG. 2 illustrates that multiple thermal storage arrays 209 may be present within system 200. These arrays may be thermally isolated from one another and may be separately controllable. FIG. 2 is merely intended to provide a conceptual representation of how thermal storage 205 might be implemented-one such implementation might, for example, include only two arrays, or might include six arrays, or ten arrays, or more.

In the depicted implementation, a blower 213 drives air or other fluid to thermal storage 205 such that the air is eventually received at a lower portion of each of the arrays 209. The air flows upward through the channels and chambers formed by blocks in each of the arrays 209, with flow controlled by louvers. By the release of heat energy from the resistive heating elements 207, heat is radiatively transferred to arrays 209 of blocks during a charging mode. Relatively hotter block surfaces reradiate absorbed energy (which may be referred to as a radiative "echo") and participate in heating cooler surfaces. During a discharging mode, the heat stored in arrays 209 is output, as indicated at 215.

Once the heat has been output in the form of a fluid such as hot air, the fluid may be provided for one or more downstream applications. For example, hot air may be used directly in an industrial process that is configured to receive the hot air, as shown at 217. Further, hot air may be provided as a stream 219 to a heat exchanger 218 of a steam generator 222, and thereby heats a pressurized fluid such as air, water, $CO_2$ or other gas. In the example shown, as the hot air stream 219 passes over a line 221 that provides the water from the pump 223 as an input, the water is heated and steam is generated as an output 225, which may be provided to an industrial application as shown at 227.

Figure 3:
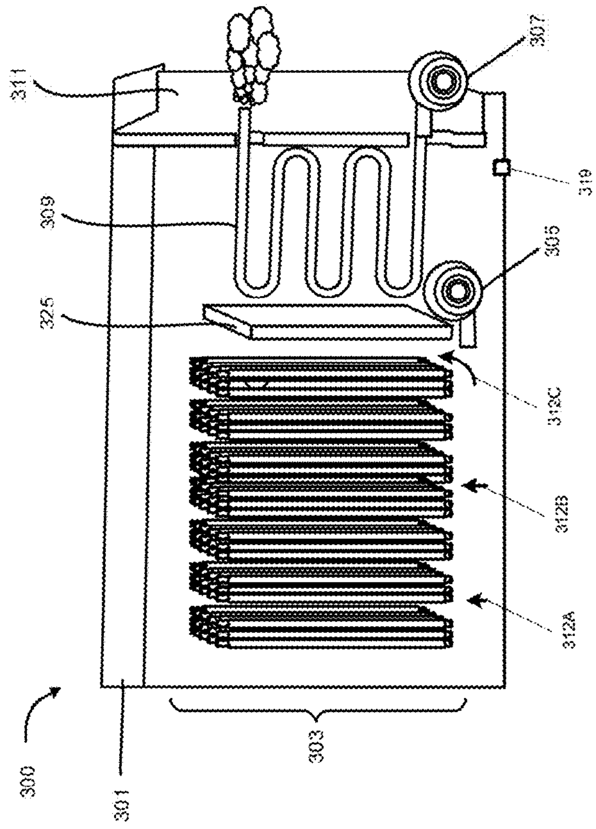
FIG. 3 illustrates a schematic diagram of a storage-fired once-through steam generator (OTSG) according to the example implementations.

A thermal storage structure such as that depicted in FIGS. 1-2 may also include output equipment configured to produce steam for use in a downstream application. FIG. 3, for example, depicts a block diagram of an implementation of a thermal storage structure 300 that includes a storage-fired once-through steam generator (OTSG). An OTSG is a type of heat recovery stream generator (HRSG), which is a heat exchanger that accepts hot air from a storage unit, returns cooler air, and heats an external process fluid. The depicted OTSG is configured to use thermal energy stored in structure 300 to generate steam at output 311.

As has been described, thermal storage structure 300 includes outer structure 301 such walls, a roof, as well as thermal storage 303 in a first section of the structure. The OTSG is located in a second section of the structure, which is separated from the first section by thermal barrier 325. During a charging mode, thermal energy is stored in thermal storage 303. During a discharging mode, the thermal energy stored in thermal storage 303 receives a fluid flow (e.g., air) by way of a blower 305. These fluid flows may be generated from fluid entering structure 300 via an inlet valve 319 and include a first fluid flow 312A (which may be directed to a first stack within thermal storage 303) and a second fluid flow 312B (which may be directed to a second stack within thermal storage 303).

As the air or other fluid directed by blower 305 flows through the thermal storage 303 from the lower portion to the upper portion, it is heated and is eventually output at the upper portion of thermal storage 303. The heated air, which may be mixed at some times with a bypass fluid flow 312C that has not passed through thermal storage 302, is passed over a conduit 309 through which flows water, or another fluid pumped by the water pump 307. As the hot air heats up the water in the conduit, steam is generated at 311. The cooled air that has crossed the conduit (and transferred heat to the water flowing through it) is then fed back into the block heat storage 303 by blower 305. As explained below, the control system can be configured to control attributes of the steam, including steam quality, or fraction of the steam in the vapor phase, and flow rate.

As shown in FIG. 3, an OTSG does not include a recirculating drum boiler. Properties of steam produced by an OTSG are generally more difficult to control than those of steam produced by a more traditional HRSG with a drum, or reservoir. The steam drum in such an HRSG acts as a phase separator for the steam being produced in one or more heated tubes recirculating the water; water collects at the bottom of the reservoir while the steam rises to the top. Saturated steam (having a steam quality of 100%) can be collected from the top of the drum and can be run through an additional heated tube structure to superheat it and further assure high steam quality. Drum-type HRSGs are widely used for power plants and other applications in which the water circulating through the steam generator is highly purified and stays clean in a closed system. For applications in which the water has significant mineral content, however, mineral deposits form in the drum and tubes and tend to clog the system, making a recirculating drum design challenging to implement. In many implementations, the steam quality is not 100% unless very special steam separators are installed in the drum. There is <1% frequently <0.1% water mist entrained in the steam. As is stated, the superheating further assures the high steam quality. The function of the superheater is to evaporate any mist and to heat the vapor above the evaporation temperature, the saturated steam temperature, which is the dew point at that pressure. The dew point is the temperature and pressure that as the steam cools, even slightly, a portion of the steam, (water vapor), condenses into liquid water.

For applications using water with a higher mineral content, an OTSG may be a better option. One such application is oil extraction, in which feed water for a steam generator may be reclaimed from a water/oil mixture produced by a well. Even after filtering and softening, such water may have condensed solid concentrations on the order of 10,000 ppm or higher. The lack of recirculation in an OTSG enables operation in a mode to reduce mineral deposit formation; however, an OTSG needs to be operated carefully in some implementations to avoid mineral deposits in the OTSG water conduit. For example, having some fraction of water droplets present in the steam as it travels through the OTSG conduit may be required to prevent mineral deposits by retaining the minerals in solution in the water droplets. This consideration suggests that the steam quality (vapor fraction) of steam within the conduit should be maintained below a specified level. On the other hand, a high steam quality at the output of the OTSG may be important for the process employing the steam. Therefore, it is advantageous for a steam generator powered by VRE through TES to maintain close tolerances on outlet steam quality. There is a sensitive interplay among variables such as input water temperature, input water flow rate and heat input, which should be managed to achieve a specified steam quality of output steam while avoiding damage to the OTSG.

Implementations of the thermal energy storage system disclosed herein provide a controlled and specified source of heat to an OTSG. The controlled temperature and flow rate available from the thermal energy storage system allows effective feed-forward and feedback control of the steam quality of the OTSG output. In one implementation, feed-forward control includes using a target steam delivery rate and steam quality value, along with measured water temperature at the input to the water conduit of the OTSG, to determine a heat delivery rate required by the thermal energy storage system for achieving the target values. In this implementation, the control system can provide a control signal to command the thermal storage structure to deliver the flowing gas across the OTSG at the determined rate. In one implementation, a thermal energy storage system integrated with an OTSG includes instrumentation for measurement of the input water temperature to the OTSG.

In one implementation, feedback control includes measuring a steam quality value for the steam produced at the outlet of the OTSG, and a controller using that value to adjust the operation of the system to return the steam quality to a desired value. Obtaining the outlet steam quality value may include separating the steam into its liquid and vapor phases and independently monitoring the heat of the phases to determine the vapor phase fraction. Alternatively, obtaining the outlet steam quality value may include measuring the pressure and velocity of the outlet steam flow and the pressure and velocity of the inlet water flow, and using the relationship between values to calculate an approximation of the steam quality. Based on the steam quality value, a flow rate of the outlet fluid delivered by the thermal storage to the OTSG may be adjusted to achieve or maintain the target steam quality. In one implementation, the flow rate of the outlet fluid is adjusted by providing a feedback signal to a controllable element of the thermal storage system. The controllable element may be an element used in moving fluid through the storage medium, such as a blower or other fluid moving device, a louver, or a valve.

The steam quality measurement of the outlet taken in real time may be used as feedback by the control system to determine the desired rate of heat delivery to the OTSG. To accomplish this, an implementation of a thermal energy storage system integrated with an OTSG may include instruments to measure inlet water velocity and outlet steam flow velocity, and, optionally, a separator along with instruments for providing separate measurements of the liquid and vapor heat values. In some implementations, the tubing in an OTSG is arranged such that the tubing closest to the water inlet is positioned in the lowest temperature portion of the airflow, and that the tubing closest to the steam exit is positioned in the highest temperature portion of the airflow. In some implementations of the present innovations, the OTSG may instead be configured such that the highest steam quality tubes (closest to the steam outlet) are positioned at some point midway through the tubing arrangement, so as to enable higher inlet fluid temperatures from the TSU to the OTSG while mitigating scale formation within the tubes and overheating of the tubes, while maintaining proper steam quality. The specified flow parameters of the heated fluid produced by thermal energy storage systems as disclosed herein may in some implementations allow precise modeling of heat transfer as a function of position along the conduit. Such modeling may allow specific design of conduit geometries to achieve a specified steam quality profile along the conduit.

Figure 4:
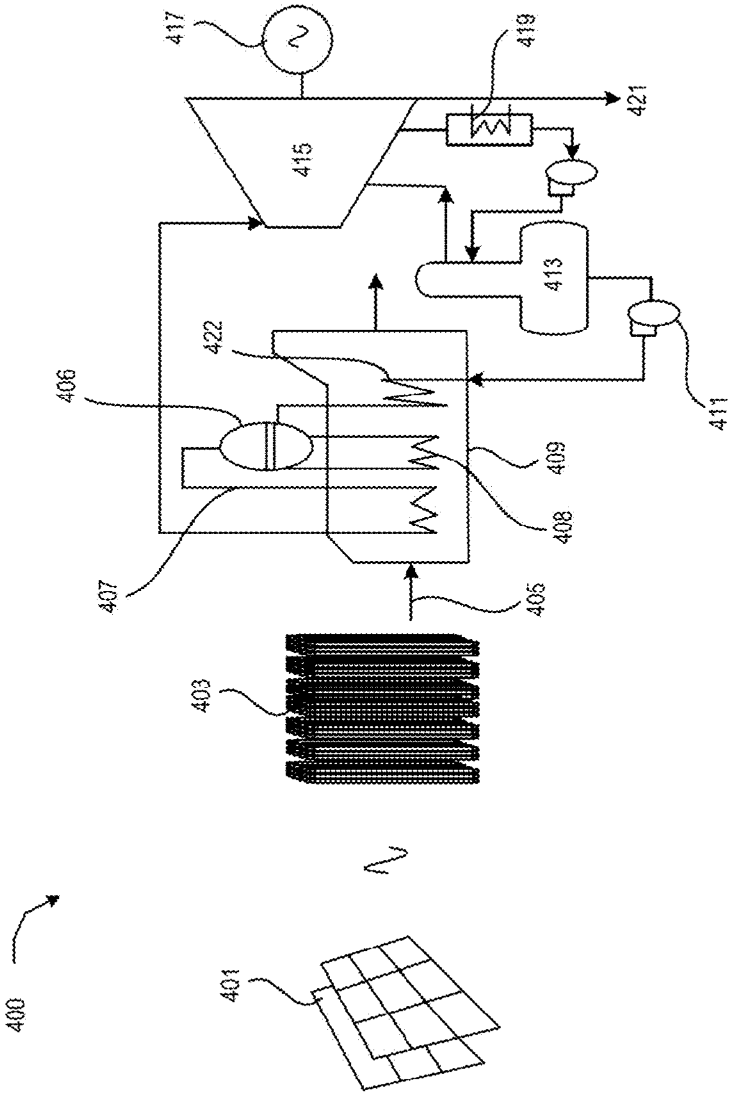
FIG. 4 illustrates an example view of a system being used as an integrated cogeneration system according to the example implementations.

As shown in FIG. 4, the output of the thermal energy storage system may be used for an integrated cogeneration system 400. As previously explained, an energy source 401 provides electrical energy that is stored as heat in the heat storage 403 of the TSU. During discharge, the heated air is output at 405. As shown in FIG. 4, lines containing a fluid, in this case water, are pumped into a drum 406 of an HRSG 409 via a preheating section of tubing 422. In this implementation, HRSG 409 is a recirculating drum type steam generator, including a drum or boiler 406 and a recirculating evaporator section 408. The output steam passes through line 407 to a superheater coil, and is then provided to a turbine at 415, which generates electricity at 417. As an output, the remaining steam 421 may be expelled to be used as a heat source for a process or condensed at 419 and optionally passed through to a deaeration unit 413 and delivered to pump 411 in order to perform subsequent steam generation. In many implementations, when superheated steam is used at least partially for mechanical power, the pressure is reduced through a turbine. This reduces the temperature even more than the pressure, and the temperature passes through the dew point and some of the steam condenses in the turbine. The water is detrimental to the turbine. Therefore, for co-generation or power projects, it may be desirable to add more heat to the steam to elevate the temperature to allow the temperature to drop and still be above the dew point for extraction of mechanical power without condensing water. For heating, as in distillation, the steam is saturated, as the condensation at high temperature delivers the most heat at the highest temperature.

Certain industrial applications may be particularly well-suited for cogeneration. For example, some applications use higher temperature heat in a first system, such as to convert the heat to mechanical motion as in the case of a turbine, and lower-temperature heat discharged by the first system for a second purpose, in a cascading manner. The steam may drive a low-pressure letdown steam turbine to turn the pump and the exhaust steam may still have 90% of the energy for another use of the lower quality steam. It replaces the electric motor. Optionally, some implementations may use an inverse temperature cascade. One example involves a steam generator that makes high-pressure steam to drive a steam turbine that extracts energy from the steam, and low-pressure steam that is used in a process, such as an ethanol refinery, to drive distillation and electric power to run pumps. Still another example involves a thermal energy storage system in which hot gas is output to a turbine, and the heat of the turbine outlet gas is used to preheat inlet water to a boiler for processing heat in another steam generator (e.g., for use in an oilfield industrial application). In one application, cogeneration involves the use of hot gas at e.g., 840° C. to power or co-power hydrogen electrolysis, and the lower temperature output gas of the hydrogen electrolyzer, which may be at about 640° C., is delivered alone or in combination with higher-temperature heat from a TSU to a steam generator or a turbine for a second use. In another application, cogeneration involves the supply of heated gas at a first temperature e.g., 640° C. to enable the operation of a fuel cell, and the waste heat from the fuel cell which may be above 800° C. is delivered to a steam generator or a turbine for a second use, either alone or in combination with other heat supplied from a TSU.

A cogeneration system may include a heat exchange apparatus that receives the discharged output of the thermal storage unit and generates steam. Alternately, the system may heat another fluid such as supercritical carbon dioxide by circulating high-temperature air from the system through a series of pipes carrying a fluid, such as water or $CO_2$, (which transfers heat from the high-temperature air to the pipes and the fluid), and then recirculating the cooled air back as an input to the thermal storage structure. This heat exchange apparatus is an HRSG, and in one implementation is integrated into a section of the housing that is separated from the thermal storage.

The HRSG may be physically contained within the thermal storage structure or may be packaged in a separate structure with ducts conveying air to and from the HRSG. The HRSG can include a conduit at least partially disposed within the second section of the housing. In one implementation, the conduit can be made of thermally conductive material and be arranged so that fluid flows in a "once-through" configuration in a sequence of tubes, entering as lower-temperature fluid and exiting as higher temperature, possibly partially evaporated, two-phase flow. As noted above, once-through flow is beneficial, for example, in processing feedwater with substantial dissolved mineral contaminants to prevent accumulation and precipitation within the conduits.

Figure 6:
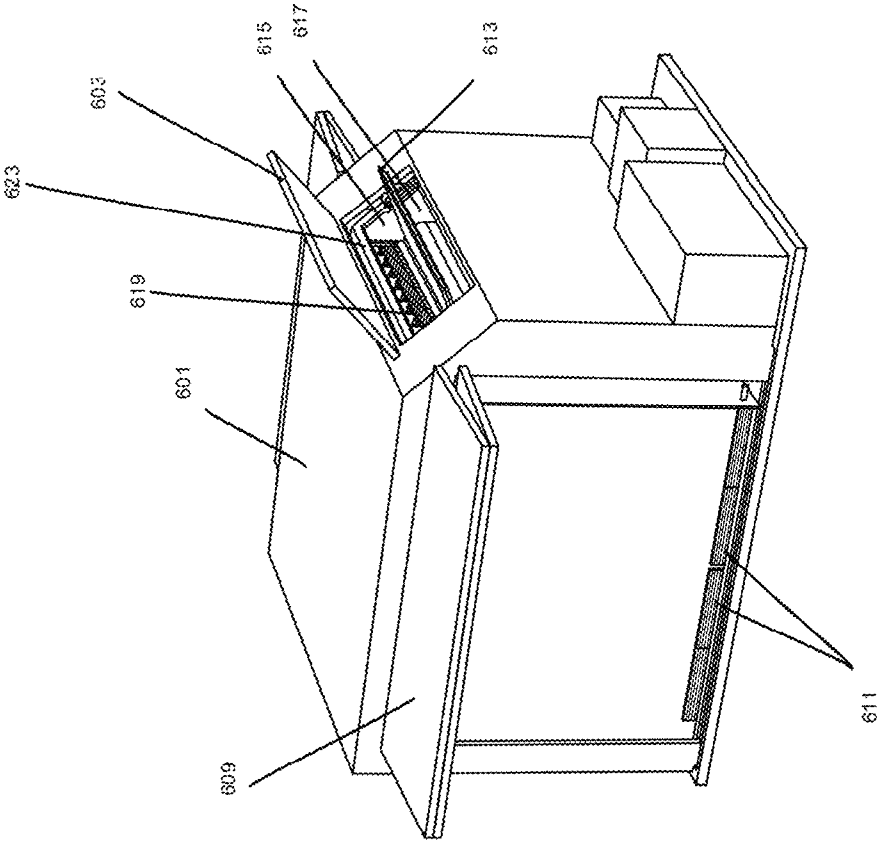
FIG. 6 provides an isometric view of the thermal storage unit with multiple vents closures open, according to some implementations.

In an OTSG implementation, a first end of the conduit can be fluidically coupled to a water source. The system may provide for inflow of the fluids from the water source into a first end of the conduit and enable outflow of the received fluid or steam from a second end of the conduit. The system can include one or more pumps configured to facilitate inflow and outflow of the fluid through the conduit. The system can include a set of valves configured to facilitate controlled outflow of steam from the second end of the conduit to a second location for one or more industrial applications or electrical power generation. As shown in FIG. 6, an HRSG may also be organized as a recirculating drum-type boiler with an economizer and optional superheater, for the delivery of saturated or superheated steam.

The output of the steam generator may be provided for one or more industrial uses. For example, steam may be provided to a turbine generator that outputs electricity for use as retail local power. The control system may receive information associated with local power demands and determine the amount of steam to provide to the turbine, so that local power demands can be met.

In addition to the generation of electricity, the output of the thermal storage structure may be used for industrial applications as explained below. Some of these applications may include, but are not limited to, electrolyzers, fuel cells, gas generation units such as hydrogen, carbon capture, manufacture of materials such as cement, calcining applications, as well as others. More details of these industrial applications are provided below.

Dynamic Insulation

It is generally beneficial for a thermal storage structure to minimize its total energy losses via effective insulation, and to minimize its cost of insulation. Some insulation materials are tolerant of higher temperatures than others. Higher-temperature tolerant materials tend to be more costly.

Figure 5:
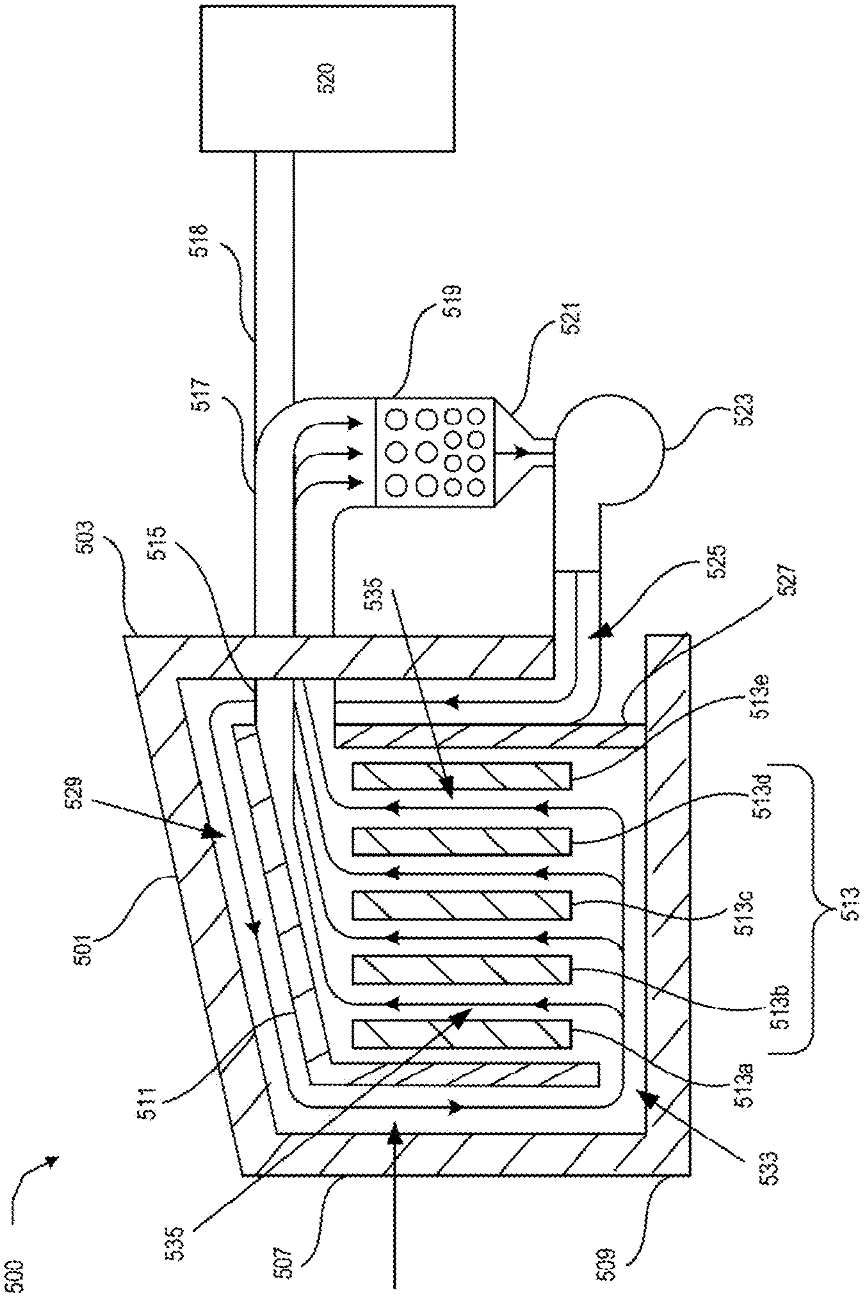
FIG. 5 illustrates dynamic insulation according to the example implementations.

FIG. 5 provides a schematic section illustration 500 of an implementation of dynamic insulation. The outer container includes roof 501, walls 503, 507 and a foundation 509. Within the outer container, a layer of insulation 511 is provided between the outer container and columns of blocks in stack 513, the columns being represented as 513*a*, 513*b*, 513*c*, 513*d* and 513*e*. The heated fluid that is discharged from the upper portion of the columns of blocks 513*a*, 513*b*, 513*c*, 513*d* and 513*e* exits by way of an output 515, which is connected to a duct 517. Duct 517 provides the heated fluid as an input to a steam generator 519. Once the heated fluid has passed through steam generator 519, some of its heat is transferred to the water in the steam generator and the stream of fluid is cooler than when exiting the steam generator. Further, the heated fluid may be used directly in an industrial process 520 that is configured to receive the heated fluid, as shown at 518. Cooler recycled fluid exits a bottom portion 521 of the steam generator 519. An air blower 523 receives the cooler fluid, and provides the cooler fluid, via a passage 525 defined between the walls 503 and insulation 527 positioned adjacent the stack 513, through an upper air passage 529 defined between the insulation 511 and the roof 501, down through side passages 531 defined on one or more sides of the stack 513 and the insulation 511, and thence down to a passage 533 directly below the stack 513.

The air in passages 525, 529, 531 and 533 acts as an insulating layer between (a) the insulations 511 and 527 surrounding the stack 513, and (b) the roof 501, walls 503, 507 and foundation 509. Thus, heat from the stack 513 is prevented from overheating the roof 501, walls 503, 507 and foundation 509. At the same time, the air flowing through those passages 525, 529, 531 and 533 carries by convection heat that may penetrate the insulations 511 and/or 517 into air flow passages 535 of the stack 513, thus preheating the air, which is then heated by passage through the air flow passages 535.

The columns of blocks 513*a*, 513*b*, 513*c*, 513*d* and 513*e* and the air passages 535 are shown schematically in FIG. 5. The physical structure of the stacks and air flow passages therethrough in implementations described herein is more complex, leading to advantages.

In some implementations, to reduce or minimize the total energy loss, the layer of insulation 511 is a high-temperature primary insulation that surrounds the columns 513*a*, 513*b*, 513*c*, 513*d* and 513*e* within the housing. Outer layers of lower-cost insulation may also be provided. The primary insulation may be made of thermally insulating materials selected from any combination of refractory blocks, alumina fiber, ceramic fiber, and fiberglass or any other material that might be apparent to a person of ordinary skill in the art. The amount of insulation required to achieve low losses may be large, given the high temperature differences between the storage medium and the environment. To reduce energy losses and insulation costs, conduits are arranged to direct returning, cooler fluid from the HRSG along the outside of a primary insulation layer before it flows into the storage core for reheating.

The cooler plenum, including passages 525, 529, 531 and 533, is insulated from the outside environment, but total temperature differences between the cooler plenum and the outside environment are reduced, which in turn reduces thermal losses. This technique, known as "dynamic insulation," uses the cooler returning fluid, as described above, to recapture heat which passes through the primary insulation, preheating the cooler air before it flows into the stacks of the storage unit. This approach further serves to maintain design temperatures within the foundation and supports of the thermal storage structure. Requirements for foundation cooling in existing designs (e.g., for molten salt) involve expensive dedicated blowers and generators—requirements avoided by implementations according to the present teaching.

The materials of construction and the ground below the storage unit may not be able to tolerate high temperatures, and in the present system active cooling—aided by the unassisted flowing heat exchange fluid in the case of power failure—can maintain temperatures within design limits.

A portion of the fluid returning from the HRSG may be directed through conduits such as element 521 located within the supports and foundation elements, cooling them and delivering the captured heat back to the input of the storage unit stacks as preheated fluid. The dynamic insulation may be provided by arranging the blocks 513*a*, 513*b*, 513*c*, 513*d* and 513*e* within the housing so that the blocks 513*a*, 513*b*, 513*c*, 513*d* and 513*e* are not in contact with the outer surface 501, 503, 507 of the housing, and are thus thermally isolated from the housing by the primary insulation formed by the layer of cool fluid. The blocks 513*a*, 513*b*, 513*c*, 513*d* and 513*e* may be positioned at an elevated height from the bottom of the housing, using a platform made of thermally insulating material.

During unit operation, a controlled flow of relatively cool fluid is provided by the fluid blowing units 523, to a region (including passages 525, 529, 531 and 533) between the housing and the primary insulation (which may be located on an interior or exterior of an inner enclosure for one or more thermal storage assemblages), to create the dynamic thermal insulation between the housing and the blocks, which restricts the dissipation of thermal energy being generated by the heating elements and/or stored by the blocks into the outside environment or the housing, and preheats the fluid. As a result, the controlled flow of cold fluid by the fluid blowing units of the system may facilitate controlled transfer of thermal energy from the blocks to the conduit, and also facilitates dynamic thermal insulation, thereby making the system efficient and economical.

In another example implementation, the buoyancy of fluid can enable an unassisted flow of the cold fluid around the blocks between the housing and the primary insulator 511 such that the cold fluid may provide dynamic insulation passively, even when the fluid blowing units 523 fail to operate in case of power or mechanical failure, thereby maintaining the temperature of the system within predefined safety limits, to achieve intrinsic safety. The opening of vents, ports, or louvres (not shown) may establish passive buoyancy-driven flow to maintain such flow, including cooling for supports and foundation cooling, during such power outages or unit failures, without the need for active equipment.

In the above-described fluid flow, the fluid flows to an upper portion of the unit, down the walls and into the inlet of the stacking, depending on the overall surface area to volume ratio, which is in turn dependent on the overall unit size, the flow path of the dynamic insulation may be changed. For example, in the case of smaller units that have greater surface area as compared with the volume, the amount of fluid flowing through the stack relative to the area may utilize a flow pattern that includes a series of serpentine channels, such that the fluid flows on the outside, moves down the wall, up the wall, and down the wall again before flowing into the inlet. Other channelization patterns may also be used.

Additionally, the pressure difference between the return fluid in the insulation layer and the fluid in the stacks may be maintained such that the dynamic insulation layer has a substantially higher pressure than the pressure in the stacks themselves. Thus, if there is a leak between the stacks and the insulation, the return fluid at the higher pressure may be forced into the leak or the cracks, rather than the fluid within the stacks leaking out into the dynamic insulation layer. Accordingly, in the event of a leak in the stacks, the very hot fluid of the stacks may not escape outside of the unit, but instead the return fluid may push into the stacks, until the pressure between the dynamic insulation layer in the stacks equalizes. Pressure sensors may be located on either side of the blower that provide relative and absolute pressure information. With such a configuration, a pressure drop within the system may be detected, which can be used to locate the leak.

Earlier systems that store high temperature sensible heat in rocks and molten salts have required continuous active means of cooling foundations, and in some implementations continuous active means of heating system elements to prevent damage to the storage system; thus, continuous active power and backup power supply systems are required. A system as described herein does not require an external energy supply to maintain the safety of the unit. Instead, as described below, the present disclosure provides a thermal storage structure that provides for thermally induced flows that passively cools key elements when equipment, power, or water fails. This also reduces the need for fans or other cooling elements inside the thermal storage structure.

Forecast-Based System Control

As noted above, forecast information such as weather predictions may be used by a control system to reduce wear and degradation of system components. Another goal of forecast-based control is to ensure adequate thermal energy production from the thermal energy storage system to the load or application system. Actions that may be taken in view of forecast information include, for example, adjustments to operating parameters of the thermal energy storage system itself, adjustments to an amount of input energy coming into the thermal energy storage system, and actions or adjustments associated with a load system receiving an output of the thermal energy storage system.

Weather forecasting information can come from one or more of multiple sources. One source is a weather station at a site located with the generation of electrical energy, such as a solar array or photovoltaic array, or wind turbines. The weather station may be integrated with a power generation facility and may be operationally used for control decisions of that facility, such as for detection of icing on wind turbines. Another source is weather information from sources covering a wider area, such as radar or other weather stations, which may be fed into databases accessible by the control system of the thermal energy storage system. Weather information covering a broader geography may be advantageous in providing more advanced notice of changes in condition, as compared to the point source information from a weather station located at the power source. Still another possible source of weather information is virtual or simulated weather forecast information. In general, machine learning methods can be used to train the system, taking into account such data and modifying behavior of the system.

As an example, historical information associated with a power curve of an energy source may be used as a predictive tool, taking into account actual conditions, to provide forecasting of power availability and adjust control of the thermal energy storage system, both as to the amount of energy available to charge the units and the amount of discharge heat output available. For example, the power curve information may be matched with actual data to show that when the power output of a photovoltaic array is decreasing, it may be indicative of a cloud passing over one or more parts of the array, or cloudy weather generally over the region associated with the array.

Forecast-related information is used to improve the storage and generation of heat at the thermal energy storage system in view of changing conditions. For example, a forecast may assist in determining the amount of heat that should be stored and the rate at which heat should be discharged in order to provide a desired output to an industrial application—for instance, in the case of providing heat to a steam generator, to ensure a consistent quality and amount of steam, and to ensure that the steam generator does not have to shut down. The controller may adjust the current and future output of heat in response to current or forecast reductions in the availability of charging electricity, so as to ensure across a period of future time that the state of charge of the storage unit does not reduce so that heat output should be stopped. By adjusting the continuous operation of a steam generator to a lower rate in response to a forecasted reduction of available input energy, the unit may operate continuously. The avoidance of shutdowns and later restarts is an advantageous feature: shutting down and restarting a steam generator is a time-consuming process that is costly and wasteful of energy, and potentially exposes personnel and industrial facilities to safety risks.

The forecast, in some cases, may be indicative of an expected lower electricity input or some other change in electricity input pattern to the thermal energy storage system. Accordingly, the control system may determine, based on the input forecast information, that the amount of energy that would be required by the thermal energy storage system to generate the heat desired to meet the demands of the steam generator or other industrial application is lower than the amount of energy expected to be available. In one implementation, making this determination involves considering any adjustments to operation of the thermal energy storage system that may increase the amount of heat it can produce. For example, one adjustment that may increase an amount of heat produced by the system is to run the heating elements in a thermal storage assemblage at a higher power than usual during periods of input supply availability, in order to obtain a higher temperature of the assemblage and greater amount of thermal energy stored. Such "overcharging" or "supercharging" of an assemblage, as discussed further below, may in some implementations allow sufficient output heat to be produced through a period of lowered input energy supply. Overcharging may increase stresses on the thermal storage medium and heater elements of the system, thus increasing the need for maintenance and the risk of equipment failure.

As an alternative to operational adjustments for the thermal energy storage system, or in implementations for which such adjustments are not expected to make up for a forecasted shortfall of input energy, action on either the source side or the load side of the thermal energy storage system may be initiated by the control system. On the input side, for example, the forecast difference between predicted and needed input power may be used to provide a determination, or decision-support, with respect to sourcing input electrical energy from other sources during an upcoming time period, to provide the forecasted difference. For example, if the forecasting system determines that the amount of electrical energy to be provided from a photovoltaic array will be 70% of the expected amount needed over a given period of time, e.g., due to a forecast of cloudy weather, the control system may effectuate connection to an alternative input source of electrical energy, such as wind turbine, natural gas or other source, such that the thermal energy storage system receives 100% of the expected amount of energy. In an implementation of a thermal energy storage system having an electrical grid connection available as an alternate input power source, the control system may effectuate connection to the grid in response to a forecast of an input power shortfall.

In a particular implementation, forecast data may be used to determine desired output rates for a certain number of hours or days ahead, presenting to an operator signals and information relating to expected operational adjustments to achieve those output rates, and providing the operator with a mechanism to implement the output rates as determined by the system, or alternatively to modify or override those output rates. This may be as simple as a "click to accept" feedback option provided to the operator, a dead-man's switch that automatically implements the determined output rates unless overridden, and/or more detailed options of control parameters for the system.

II. Heat Transport in TSU: Blocks and Heating Elements a. Problems Solved by One or More Disclosed Implementations Traditional approaches to the formation of energy storage cells may have various problems and disadvantages. For example, traditional approaches may not provide for uniform heating of the thermal energy storage cells. Instead, they may use structures that create uneven heating, such as hot spots and cold spots. Non-uniform heating may reduce the efficiency of an energy storage system, lead to earlier equipment failure, cause safety problems, etc. Further, traditional approaches may suffer from wear and tear on thermal energy storage cells. For example, stresses such as mechanical and thermal stress may cause deterioration of performance, as well as destabilization of the material, such as cracking of the blocks.

B. Example Solutions Disclosed Herein

In some implementations, thermal storage blocks (e.g., blocks) have various features that facilitate more even distribution. As one example, blocks may be formed and positioned to define fluid flow pathways with chambers that are open to heating elements to receive radiative energy. Therefore, a given fluid flow pathway (e.g., oriented vertically from the top to bottom of a stack) may include two types of openings: radiation chambers that are open to a channel for a heating element and fluid flow openings (e.g., fluid flow slots) that are not open to the channel. The radiation chambers may receive infrared radiation from heater elements, which, in conjunction with conductive heating by the heater elements may provide more uniform heating of an assemblage of thermal storage blocks, relative to traditional implementations. The fluid flow openings may receive a small amount of radiative energy indirectly via the chambers but are not directly open to the heating element. The stack of blocks may be used alone or in combination with other stacks of blocks to form the thermal storage unit, and one or more thermal storage units may be used together in the thermal energy storage system. As the fluid blower circulates the fluid through the structure during charge and discharge as explained above, a thermocline may be formed in a substantially vertical direction; that is, the temperature differences are relatively small or minimal between regions of fluid in a substantially vertically oriented plane or virtual "slice" through the storage medium. Further, the fluid movement system may direct relatively cooler fluid for insulative purposes, e.g., along the insulated walls and roof of the structure. Finally, a venting system may allow for controlled cooling for maintenance or in the event of power loss, water loss, blower failure, etc., which may advantageously improve safety relative to traditional techniques.

Designs according to the present disclosure combine several key innovations, which together address these challenges and enable a cost-effective, safe, reliable high-temperature thermal energy storage system to be built and operated. A carefully structured solid medium system according to the present teaching incorporates structured airflow passages which accomplish effective thermocline discharge; repeated mixing chambers along the direction of air flow which mitigate the thermal effects of any localized air channel blockages or nonuniformities; effective shielding of thermal radiation from propagating in the vertical direction; and a radiation chamber structure which uniformly and rapidly heats block material with high heater power loading, low and uniform exposed surface temperature, and long-distance heat transfer within the storage medium array via multi-step thermal radiation.

Innovative structures according to the present disclosure may include an array of blocks that form chambers. The blocks have structured air passages, such that in the vertical direction air flows upwards in a succession of open chambers and small air passages. In some implementations, the array of blocks with internal air passages is organized in a structure such that the outer surface of each block within the TSU core forms a wall of a chamber in which it is exposed to radiation from other block surfaces, as well as radiation originating from an electrical heater.

The chamber structure is created by alternating block materials into a checkerboard-type pattern, in which each block is surrounded on all sides by open chambers, and each open chamber has adjacent blocks as its walls. In addition, horizontal parallel passages are provided that pass through multiple chambers. Electrical heating elements that extend horizontally through the array are installed in these passages. An individual heating element it may be exposed along its length to the interior spaces of multiple chambers. Each block within such a checkerboard structure is exposed to open chambers on all sides. Accordingly, during charging, radiant energy from multiple heating elements heats all outer surfaces of each block, contributing to the rapid and even heating of the block, and reducing reliance on conductive heat transfer within the block by limiting the internal dimensions of the block.

The radiation chamber structure provides a key advance in the design and production of effective thermal energy storage systems that are charged by electrical energy. The large surface area, which is radiatively exposed to heaters, causes the average temperature of the large surface to determine the radiation balance and thus the surface temperature of the heater. This intrinsic uniformity enables a high wattage per unit area of heater without the potential of localized overheating. And exposed block surfaces are larger per unit of mass than in prior systems, meaning that incoming wattage per unit area is correspondingly smaller, and consequently thermal stresses due to block internal temperature differences are lower. And critically, re-radiation of energy—radiation by hotter block surfaces that is absorbed by cooler block surfaces—reduces by orders of magnitude the variations in surface temperature, and consequently reduces thermal stresses in block materials exposed to radiant heat. Thus, the radiation chamber design effectively enables heat to be delivered relatively uniformly to a large horizontally oriented surface area and enables high wattage per unit area of heater with relatively low wattage per unit area of block.

Note that while this configuration is described in terms of "horizontal" and "vertical", these are not absolute degree or angle restrictions. Advantageous factors include maintaining a thermocline and providing for fluid flow through the stack in a direction that results in convective heat transfer, exiting the stack at a relatively hotter portion of the thermocline. An additional advantageous factor that may be incorporated is to position the stack in a manner that encourages buoyant, hot air to rise through the stack and exit at the hot end of the thermocline; in this case, a stack in which the hot end of the thermocline is at a higher elevation than the cold end of the thermocline is effective, and a vertical thermocline maximizes that effectiveness.

An important advantage of this design is that uniformity of heating element temperature is strongly improved in designs according to the present disclosure. Any variations in block heat conductivity, or any cracks forming in a block that result in changed heat conductivity, are strongly mitigated by radiation heat transfer away from the location with reduced conductivity. That is, a region reaching a higher temperature than nearby regions due to reduced effectiveness of internal conduction will be out of radiation balance with nearby surfaces and will as a result be rapidly cooled by radiation to a temperature relatively close to that of surrounding surfaces. As a result, both thermal stresses within solid media and localized peak heater temperatures are reduced by a large factor compared to previous designs.

The system may include one or more air blowing units including any combination of fans and, blowers, and configured at predefined positions in the housing to facilitate the controlled flow of air between a combination of the first section, the second section, and the outside environment. The first section may be isolated from the second section by a thermal barrier. The air blowing units may facilitate the flow of air through at least one of the channels of the blocks from the bottom end of the cells to the upper end of the cells in the first section at the predefined flow rate, and then into the second section, such that the air passing through the blocks and/or heating elements of the cells at the predefined flow rate may be heated to a second predefined temperature, and may absorb and transfer the thermal energy emitted by the heating elements and/or stored by the blocks within the second section. The air may flow from the second section across a steam generator or other heat exchanger containing one or more conduits, which carry a fluid, and which, upon receiving the thermal energy from the air having the second predefined temperature, may heat the fluid flowing through the conduit to a higher temperature or may convert the fluid into steam. Further, the system may facilitate outflow of the generated steam from the second end of the conduit to a predefined location for one or more industrial applications. The second predefined temperature of the air may be based on the material being used in conduit, and the required temperature and pressure of the steam. In another implementation, the air leaving the second section may be delivered externally to an industrial process.

Additionally, the example implementations described herein disclose a resistive heating element. The resistive heating element may include a resistive wire. The resistive wire may have a cross-section that is substantially round, elongated, flat, or otherwise shaped to admit as heat the energy received from the input of electrical energy.

Passive Cooling

FIG. 6 provides an isometric view of the thermal storage unit with multiple vent closures open, according to some implementations. Therefore, FIG. 6 may represent a maintenance or failsafe mode of operation. As shown, the thermal storage unit also includes an inner enclosure 623. The outer surface of inner enclosure 623 and the inner surface of the outer enclosure define a fluid passageway through which fluid may be conducted actively for dynamic cooling or passively for failsafe operation.

Inner enclosure 623 includes two vents 615 and 617 which include corresponding vent closures in some implementations (portions of vent door 613, in this example). In some implementations, vents 615 and 617 define respective passages between an interior of the inner enclosure 623 and an exterior of the inner enclosure. When the external vent closure 603 is open, these two vents are exposed to the exterior of the outer enclosure as well.

As shown, vent 615 may vent heated fluid from the thermal storage blocks conducted by duct 619. The vent 617 may allow entry of exterior fluid into the fluid passageway and eventually into the bottoms of the thermal storage block assemblies via louvers 611 (the vent closure 609 may remain closed in this situation). In some implementations, the buoyancy of fluid heated by the blocks causes it to exit vent 615 and a chimney effect pulls external fluid into the outer enclosure via vent 617. This external fluid may then be directed through louvers 611 due to the chimney effect and facilitate cooling of the unit. Speaking generally, a first vent closure may open to output heated fluid and a second vent closure may open to input external fluid for passive venting operation.

During passive cooling, the louvers 611 may also receive external fluid directly, e.g., when vent closure 609 is open. In this situation, both vents 615 and 617 may output fluid from the inner and outer enclosures.

Vent door 613 in the illustrated implementation, also closes an input to the steam generator when the vents 615 and 617 are open. This may prevent damage to steam generator components (such as water tubes) when water is cut off, the blower is not operating, or other failure conditions. The vent 617 may communicate with one or more blowers which may allow fluid to passively move through the blowers even when they are not operating. Speaking generally, one or more failsafe vent closure may close one or more passageways to cut off fluid heated by the thermal storage blocks and reduce or avoid equipment damage.

When the vent door 613 is closed, it may define part of the fluid passageway used for dynamic insulation. For example, the fluid movement system may move fluid up along one wall of the inner enclosure, across an outer surface of the vent door 613, across a roof of the inner enclosure, down one or more other sides of the inner enclosure, and into the thermal storage blocks (e.g., via louvers 611). Louvers 611 may allow control of fluid flow into assemblages of thermal storage blocks, including independent control of separately insulated assemblages in some implementations.

In the closed position, vent door 613 may also define an input pathway for heated fluid to pass from the thermal storage blocks to duct 619 and beneath the vent door 613 into the steam generator to generate steam.

In some implementations, one or more of vent door 613, vent closure 603, and vent closure 609 are configured to open in response to a nonoperating condition of one or more system elements (e.g., nonoperation of the fluid movement system, power failure, water failure, etc.). In some implementations, one or more vent closures or doors are held in a closed position using electric power during normal operation and open automatically when electric power is lost or in response to a signal indicating to open.

In some implementations, one or more vent closures are opened while a fluid blower is operating, e.g., to rapidly cool the unit for maintenance.

Thermoelectric Power Generation

1. Problems to be Solved

Gasification is the thermal conversion of organic matter by partial oxidation into gaseous product, consisting primarily of $H_2$, carbon monoxide (CO), and may also include methane, water, $CO_2$ and other products. Biomass (e.g., wood pellets), carbon rich waste (e.g. paper, cardboard) and even plastic waste can be gasified to produce hydrogen rich syngas at high yields with high temperature steam, with optimum yields attained at >1000° C. The rate of formation of combustible gases are increased by increasing the temperature of the reaction, leading to a more complete conversion of the fuel. The yield of hydrogen, for example, increases with the rise of reaction temperature.

Turning waste carbon sources into a useable alternative energy or feedstock stream to fossil fuels is a potentially highly impactful method for reducing carbon emissions and valorizing otherwise unused carbon sources.

2. Thermoelectric Power Generation

Indirect gasification uses a Dual Fluidized Bed (DFB) system consisting of two intercoupled fluidized bed reactors—one combustor and one gasifier—between which a considerable amount of bed material is circulated. This circulating bed material acts as a heat carrier from the combustor to the gasifier, thus satisfying the net energy demand in the gasifier originated by the fact that it is fluidized solely with steam, i.e., with no air/oxygen present, in contrast to the classical approach in gasification technology also called direct gasification. The absence of nitrogen and combustion in the gasifying chamber implies the generation of a raw gas with much higher heating value than that in direct gasification. The char which is not converted in the gasifying chamber follows the circulating bed material into the combustor, which is fluidized with air, where it is combusted and releases heat which is captured by the circulating bed material and thereby transported into the gasifier in order to close the heat balance of the system.

Referring to FIG. 4, in some example implementations, the thermal energy storage structure 403 can be integrated directly with a steam power plant to provide an integrated cogeneration system 400 for a continuous supply of hot air, steam and/or electrical power for various industrial applications. Thermal storage structure 403 may be operatively coupled to electrical energy sources 401 to receive electrical energy and convert and store the electrical energy in the form of thermal energy. In some implementations, at least one of the electrical energy sources 401 may include an input energy source having intermittent availability. However, electrical energy sources 401 may also include input energy sources having on-demand availability, and combinations of intermittent and on-demand sources are also possible and contemplated. The system 403 can be operatively coupled to a heat recovery steam generator (HRSG) 409 which is configured to receive heated air from the system 403 for converting the water flowing through conduits 407 of the HRSG 409 into steam for the steam turbine 415. In an alternative implementation, HRSG 409 is a once-through steam generator in which the water used to generate steam is not recirculated. However, implementations in which the water used to generate steam is partially or fully circulated as shown in FIG. 4 are also possible and contemplated.

A control unit can control the flow of the heated air (and more generally, a fluid) into the HRSG 409, based on load demand, cost per KWH of available energy source, and thermal energy stored in the system. The steam turbine 415 can be operatively coupled to a steam generator 409, which can be configured to generate a continuous supply of electrical energy. Further, the steam turbine 415 can also release a continuous flow of relatively lower-pressure 421 steam as output to supply an industrial process. Accordingly, implementations are possible and contemplated in which steam is received by the turbine at a first pressure and is output therefrom at a second, lower pressure, with lower pressure steam being provided to the industrial process. Examples of such industrial process that may utilize the lower pressure output steam include (but are not limited to) production of liquid transportation fuels, including petroleum fuels, biofuel production, production of diesel fuels, production of ethanol, grain drying, and so on.

The production of ethanol as a fuel from starch and cellulose involves aqueous processes including hydrolysis, fermentation and distillation. Ethanol plants have substantial electrical energy demand for process pumps and other equipment, and significant demands for heat to drive hydrolysis, cooking, distillation, dehydrating, and drying the biomass and alcohol streams. It is well known to use conventional electric power and fuel-fired boilers, or fuel-fired cogeneration of steam and power, to operate the fuel production process. Such energy inputs are a significant source of $CO_2$ emissions, in some cases 25% or more of total $CO_2$ associated with total agriculture, fuel production, and transportation of finished fuel. Accordingly, the use of renewable energy to drive such production processes is of value. Some ethanol plants are located in locations where excellent solar resources are available. Others are located in locations where excellent wind and solar resources are available.

The use of electrothermal energy storage may provide local benefits in such locations to grid operators, including switchable electricity loads to stabilize the grid; and intermittently available grid electricity (e.g., during low-price periods) may provide a low-cost continuous source of energy delivered from the electrothermal storage unit.

The use of renewable energy (wind or solar power) as the source of energy charging the electrothermal storage may deliver important reductions in the total. $CO_2$ emissions involved in producing the fuel, as up to 100% of the driving electricity and driving steam required for plant operations may come from cogeneration of heat and power by a steam turbine powered by steam generated by an electrothermal storage unit. Such emissions reductions are both valuable to the climate and commercially valuable under programs which create financial value for renewable and low-carbon fuels.

The electrothermal energy storage unit having air as a heat transfer fluid may provide other important benefits to an ethanol production facility, notably in the supply of heated dry air to process elements including spent grain drying. One useful combination of heated air output and steam output from a single unit is achieved by directing the outlet stream from the HRSG to the grain dryer. In this manner, a given amount of energy storage material (e.g., block) may be cycled through a wider change in temperature, enabling the storage of extra energy in a given mass of storage material. There may be periods where the energy storage material temperature is below the temperature required for making steam, but the discharge of heated air for drying or other operations continues.

In some implementations thermal storage structure 403 may be directly integrated to industrial processing systems in order to directly deliver heat to a process without generation of steam or electricity. For example, thermal storage structure 403 may be integrated into industrial systems for manufacturing lime, concrete, petrochemical processing, or any other process that requires the delivery of high temperature air or heat to drive a chemical process. Through integration of thermal storage structure 403 charged by VRE, the fossil fuel requirements of such industrial process may be significantly reduced or possibly eliminated.

The control unit can determine how much steam is to flow through a condenser 419 versus steam output 421, varying both total electrical generation and steam production as needed. As a result, the integrated cogeneration system 400 can cogenerate steam and electrical power for one or more industrial applications.

If implemented with an OTSG as shown in FIG. 3 instead of the recirculating HRSG shown in FIG. 5, the overall integrated cogeneration system 400 can be used as thermal storage once-through steam generator (TSOTG) which can be used in oil fields and industries to deliver wet saturated steam or superheated dry steam at a specific flow rate and steam quality under automated control. High temperature delivered by the blocks and heating elements of the system 403 can power the integrated heat recovery steam generator (HRSG) 409. A closed air recirculation loop can minimize heat losses and maintain overall steam generation efficiency above 98%.

The HRSG 409 can include a positive displacement (PD) pump 411 under variable frequency drive (VFD) control to deliver water to the HRSG 409. Automatic control of steam flow rate and steam quality (including feed-forward and feed-back quality control) can be provided by the TSOTG 400. In an exemplary example implementation, a built-in Local Operator Interface (LOI) panel operatively coupled to system 400 and the control unit can provide unit supervision and control. Further, thermal storage structure 403 can be connected to a supervisory control and data acquisition system (SCADA)) associated with the steam power plant (or other load system). In one implementation, a second electrical power source is electrically connected to the steam generator pumps, blowers, instruments, and control unit.

In some implementations, system 400 may be designed to operate using feedwater with substantially dissolved solids; accordingly, a recirculating boiler configuration is impractical. Instead, a once-through steam generation process can be used to deliver wet steam without the buildup of mineral contaminants within the boiler. A serpentine arrangement of conduits 407 in an alternative once-through configuration of the HRSG 409 can be exposed to high-temperature air generated by the thermal storage structure 403, in which preheating, and evaporation of the feedwater can take place consecutively. Water can be forced through the conduits of HRSG 409 by a boiler feedwater pump, entering the HRSG 409 at the "cold" end. The water can change phase along the circuit and may exit as wet steam at the "hot" end. In one implementation, steam quality is calculated based on the temperature of air provided by the thermal storage structure 403, and feedwater temperatures and flow rates, and is measured based on velocity acceleration at the HRSG outlet. Implementations implementing a separator to separate steam from water vapor and determine the steam quality based on their relative proportions are also possible and contemplated.

In the case of an OTSG implementation, airflow (or other fluid flow) can be arranged such that the hottest air is nearest to the steam outlet at the second end of the conduit. An OTSG conduit can be mounted transversely to the airflow path and arranged in a sequence to provide highly efficient heat transfer and steam generation while achieving a low cost of materials. As a result, other than thermal losses from energy storage, steam generation efficiency can reach above 98%. The prevention of scale formation within the tubing is an important design consideration in the selection of steam quality and tubing design. As water flows through the serpentine conduit, the water first rises in temperature according to the saturation temperature corresponding to the pressure, then begins evaporating (boiling) as flow continues through heated conduits.

As boiling occurs, volume expansion causes acceleration of the rate of flow, and the concentration of dissolved solids increases proportionally with the fraction of liquid phase remaining. Maintaining concentrations below precipitation concentration limits is an important consideration to prevent scale formation. Within a bulk flow whose average mineral precipitation, localized nucleate and film boiling can cause increased local mineral concentrations at the conduit walls. To mitigate the potential for scale formation arising from such localized increases in mineral concentration, conduits which carry water being heated may be rearranged such that the highest temperature heating air flows across conduits which carry water at a lower steam quality, and that heating air at a lower-temperature flows across the conduits that carry the highest steam quality flow.

Returning to FIG. 6, various implementations are contemplated in which a fluid movement device moves fluid across a thermal storage medium, to heat the fluid, and subsequently to an HRSG such as HRSG 409 for use in the generation of steam. In one implementation, the fluid is air. Accordingly, air circulation through the HRSG 409 can be forced by a variable-speed blower, which serves as the fluid movement device in such an implementation. Air temperature can be adjusted by recirculation/mixing, to provide inlet air temperature that does not vary with the state of charge of the blocks or other mechanisms used to implement a thermal storage unit. The HRSG 409 can be fluidically coupled to a steam turbine generator 415, which upon receiving the steam from the HRSG 409, causes the production of electrical energy using generator 417. Further, the steam gas turbine 415 in various implementations releases low-pressure steam that is condensed to a liquid by a condenser 419, and then de-aerated using a deaerator 413, and again delivered to the HRSG 409.

III. Configurations for Thermal Energy Storage with High Efficiency Heater Control For thermal energy storage (TES) systems directly powered by electrical energy from a solar field or similar solar generation system, the electrical systems receiving that electrical energy typically have very specific operating requirements. The electrical system is configured to follow the pattern of the solar field, and it is desired in such an implementation to have precise control of electrical charging of the thermal energy storage system to match the field. In implementations, the electrical load follows the directly connected uncontrolled solar field output. This includes the sudden reduction in output from, for example, a storm passing across the field or sudden drop in wind if the field is a wind generator farm. If this fails, the field "trips" and the load is disconnected from the field and must be restarted after a delay and lost power for charging.

In one example, the solar field can withstand about a 10% change in voltage (+5% voltage or −5% voltage) between the rate of power generation and the rate of power consumption. Outside that range, the system will "trip" and charging is interrupted. Thus in one implementation, the charge system of the thermal energy storage system uses thyristors in its electronics that are designed to precisely track the output of the solar field and take about 95% to 100% of the capacity of the solar field. Typically, the thyristors may run at about only 80%, 70%, or other lower capacity. The thyristors are used in the TES charging system to reduce the power being consumed, to match what the field is producing. The TES systems with thyristors provide a very precise but somewhat expensive solution to follow the solar power available.

Some solar fields are tied to an electrical grid and not directly powering an energy storage system. In such systems, the electrical grid is absorbing the mismatch and the charging system for the TES system can be configured to use lower cost electronics that do not need to precisely track or match the solar field output. Normally the voltage fluctuation of the field is limited to + or −5% from nominal voltage output. This defines the limit in mismatch of generation and load without tripping the field which discontinues the output until reset. The load optimally follows both up and down within 95% of the capacity of the field. The use of thyristors limits the actual load to the available power from the field, but the capacity of the equipment installed is 100% of the potentially available power. The actual operating basis is much less than the installed capacity. This is a significant extra cost to provide a load matching capacity for connection to the solar source. Normally the equipment is only operating at 60 to 80% of capacity. Another configuration is possible by the output of the field being tied to the grid, the grid adsorbs the mismatches in power. Though this tie-in increases the cost to the field for tie-in equipment to the grid, it maximizes the opportunity for full utilization of the field's output. The power consumer pays the grid contract price for the excess above the field's output, normally on a variable real time price basis but the full output of the field can be charged into the TES without danger of tripping the field.

Figure 7A:
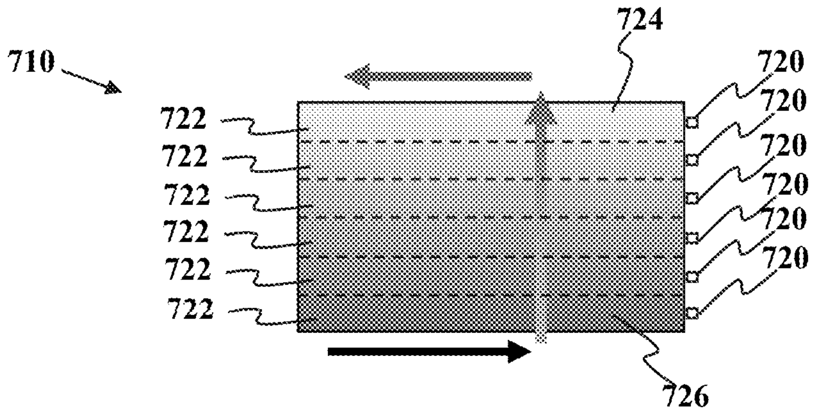
FIGS. 7A to 7C show various implementations as described herein.
Figure 7B:
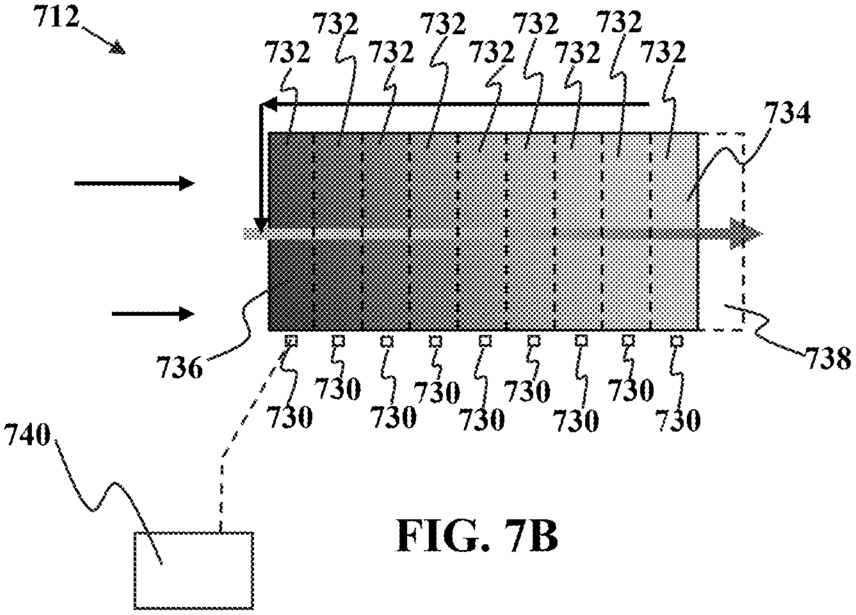
Figure 7C:
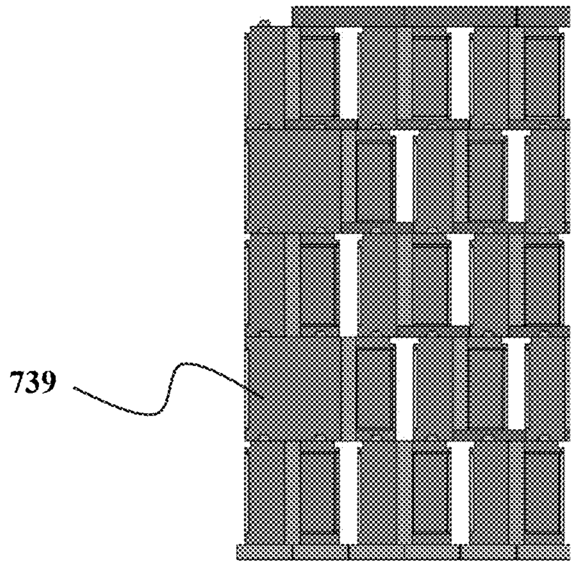
Figure 8:
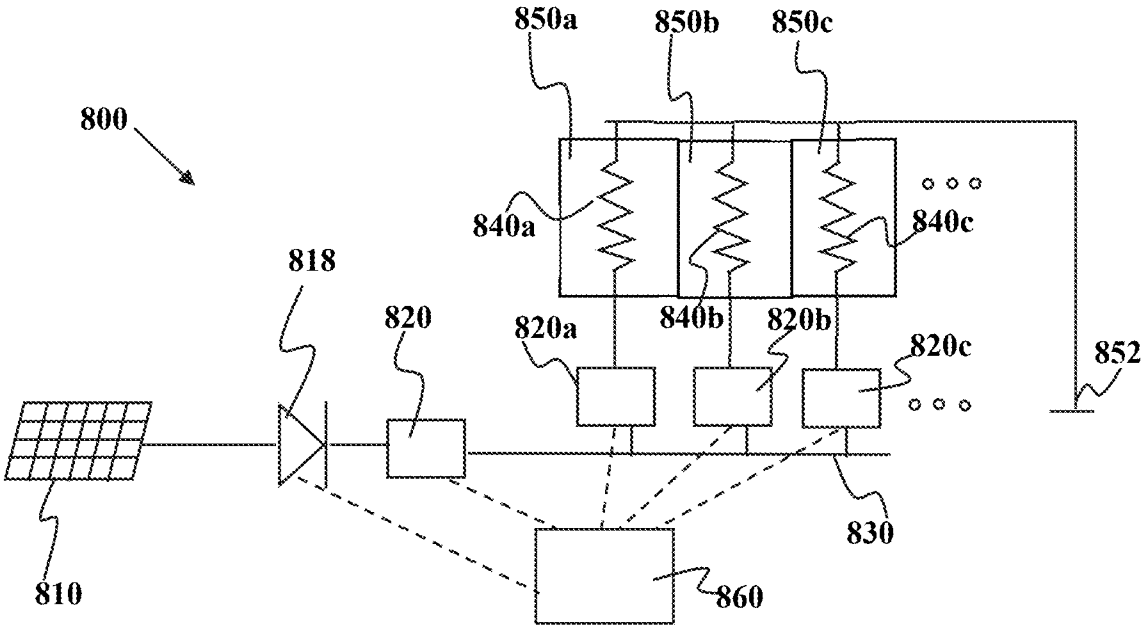
FIG. 8 shows a schematic diagram of a thermal energy storage (TES) charging system utilizing a single thyristor and a set of electrical switches to energize one or more heater circuits in response to variable power input from a renewable energy source, according to the example implementations.

For example, in FIG. 7A, the electrical system for controlling electric heaters in this implementation of the TES system 710 does not use thyristors but uses lower-cost electronics such as, but not limited to, three-phase switches 720 to control the heating and storage of the TES system 710. Each of the switches 720 controls the heater element (discussed above, but not separately shown in FIG. 7A) for that section 722 of the TES, as indicated by broken lines therebetween. FIG. 7B shows a configuration of a TES 712 for horizontal air or gas flow with switches 730 to control heating in sections 732 respectively.

The grid operator and the TES customers want to maintain a balance between the load on each of the 3 phases. Therefore, the switches in some implementations are 3-phase switches. Also, the grid operators have on any service supply line, a "stiffness", or amount of amperage that can be increased or reduced in a short time, as per minute, without unduly altering the voltage on the line. These requirements are contractual with the utility. There are also limits on the number of large loads that can be switched in or out per day.

For each of the heater sections associated with a switch, when the switch 720 or 730 is engaged, that heater section goes to 100% full power. This differs from a thyristor, which uses PWM or other modulation to adjust to effective output to a power level that may be below full power, based on matching the output from the solar field. In this new design, the electricity is not provided directly from the solar field but is instead provided from the electrical grid, which may in turn be powered by a solar field. This removes the requirement of the TES system to closely track the electrical output of the solar field. The energy storage in the TES 710 or 712 is adjusted based on the number of switches 720 or 730 (and thus heating zones 722 or 732) that are activated.

In this implementation, one section of the TES is turned on to 100% and left on to heat up. When there is enough power, a second section of the TES is turned on to 100%, and so on.

Without thyristors, the electronics generate less heat, which reduces the hardware needed to support such electronics. For example, thyristors may consume 1.5 watts per amp that they pass. For high voltage, thyristors are stacked up on top of one another. This stacking presents a challenge, due to the 1.5 watts per amp consumed by each thyristor. This is why a thyristor typically includes a chiller (e.g. using distilled water) and related hardware to cool down the thyristors. However, the cooling process consumes power and requires getting rid of waste heat from the system. In contrast, a system without thyristors can eliminate the cooling equipment.

The control technology in such a switch-based system is not as complicated as for a thyristor-based system, since the switch-based system does not have to be as fast, which reduces complexity and costs. The hardware does not need to run high voltage, instead just 400 or 480 volts, or perhaps up to 600 volts, depending on where the system is deployed geographically. The electronics system may also include motor controls, actuator controllers, computers, and an air conditioning system, none of which requires a high-power design. High-voltage systems tend to be larger, since they require greater spacing between the electronics cabinet and the walls of the electronics housing (e-house). This makes it difficult to use containers for high voltages systems. In contrast, systems designed for operation at lower voltages (e.g. at or less than about a thousand volts) can be packed and shipped in containers rather easily. This cuts the cost of the e-house and also reduces the cost of shipping the e-house.

A system according to the present new design may incorporate a new layout of heaters with no thyristors, just three-phase switches or circuit breakers. Some implementations may also have one or more sections of thermal storage blocks without heaters associated with the one or more sections.

In such implementations, the TES system is controlled using simple switches, which is easier and less expensive than the kind of different software and PWM control used in, for example, a thyristor-based system that is tracking a solar profile. The present system using simple switches can rely upon the fact that the TES system is grid connected. The system can be designed to charge when the cost of power is inexpensive or negative.

In one implementation, a TES system according to the present disclosure that is charge by solar power may be essentially depleted overnight. At and shortly after sunrise, power prices are typically neither at the cheapest nor the most expensive levels. At such times, the system activates the last bank of heaters 724 or 734 (which may be referred to as the end heaters or outlet heaters), i.e. the bank of heaters is closest to the outlet of the TES (which may be the highest bank 724 in a vertical-thermocline design, or a bank 734 at the discharge end of the system in a horizontal-thermocline design). The end heaters pull enough power to keep the outlet end of the system hot, at temperatures close to the temperatures that the outlet end achieve when the system is fully charged. When the cost of power is low (e.g. typically towards the middle of the day, when solar power is abundant relative to demand), all switches can be activated to fully charge the TES system. After the TES system is fully charged, the system can again turn off all switches except for the one(s) powering the first inlet zone 726 or 736.

With heating only one zone such as inlet zone 726 or 736, the TES system can continue to maintain essentially that same or very similar temperature profile, holding that state until the sun goes down or until power becomes expensive, and then the TES can discharge as normal.

These two keep-warm modes (heating just the outlet section and/or heating just the inlet section and/or heating only one section in the TES) provide the ability to extend the operating period during the day without the need to increase the total storage capacity. The TES system can continue to deliver heat during these keep-warm modes when power is not at maximum price but also not at minimum price. This allows the TES system to have the ability to "slide around" or time-shift when to recharge and go from storage-not-charged/just-keeping-warm, to storage-fully-charged in that cheapest charging time window. The TES system can achieve this time shifting by using the keep-warm modes and not buying additional thermal storage to do it. This can be achieved with the keep-warm modes on the two ends of the day.

Optionally, some embodiments may have additional thermal energy storage blocks in one or more sections of the TES system that are not associated with heater elements. These additional blocks such as in zone 738 are convectively heated by fluid passing through the system and conductively and/or radiatively heated by adjacent storage blocks, but not radiatively heated directly by heater elements as there are no heaters associated with the zone 738 of storage blocks.

The temperatures of these additional "passenger" blocks in zone 738 initially lags behind the temperatures of the main stack of storage blocks, but they are convectively or conductively/radiatively heated as described above and will eventually reach the temperature of the main stack. The blocks in zone 738 thus provide more thermal storage capacity. Such a system with more thermal storage capacity can also run at reduced temperatures for longer periods of time to more fully cool any hotspots in the assemblage. Optionally, some passenger block 739 may be located at an inlet end of the system. Such a system can incorporate and benefit from the features of the lead-lag, deep-discharge control described in the above-mentioned U.S. Pat. No. 11,603,776.

TES with Larger and Smaller Charging Loads

In some implementations, the system may address the load following issue by designing circuits in the TES that have larger and smaller charging loads, such as but not limited to 2× ratios. Of course, other suitable ratios may also be used. This allows the switching in of smaller electrical loads at 100% of power and replacing the smaller load with a 2× load etc. in compliance with the service agreements by switching sequentially to larger loads on increased charging and inversely on decreasing loads. The use of "smart switches" in place of the switches 730 that can be software controlled by a controller 740 can be used to simultaneously switch in the larger load and switch out the smaller load on rising loads and visa-versa for reducing connected load can achieve compliance with the utility agreement. In one implementation, there is normally a limit on the number of switches per day as the switch time is usually 2 or 3 cycles, which can be discernable.

TES with Double Throw Switches

Optionally, another implementation may use double throw switches in place of switches 730, i.e., (switches that are connected to one source in one position and to a different source in the other position) the heaters can be switched one way for full supply voltage, and in the other position the load is switched into series with other heater loads, reducing the amperage to the voltage over the sum of the resistances.

Both methods above make possible balanced phases and reduce incrementally switching loads without the use of expensive and power consuming thyristors. By the charging rate of the TES following more closely the power output of the solar field through smaller increments of added/reduced loads, the amount of potentially more expensive power from the grid can be minimized.

When using 3 phase switches for phase balancing with each phase powering a different heater circuit, if the 2× larger circuits have only two heater circuits at full 2x power, the other phase can be balanced by powering two circuits at ½ power with the addition of a fuse in each of the two circuits. This is four circuits, balanced on 3 phases. Normally when a phase controlled by a 3-phase switch becomes "open" the whole switch opens the other 2 phases. This may not be desired, yet it is necessary to keep the phases balanced in all conditions. As described later when operating in "warm" mode it may be desired to keep as much power in the first few circuits as possible. If one of the high-powered circuits in the first part of the TES becomes "open", to keep the phases balanced and the two remaining circuits powered in the 1st few circuits, two lower powered circuits in each of the other 2 phases can be opened if six circuits in the lower powered heater circuits are powered through single pole switches. The four switches in these circuits are opened in the other phases that are kept operating in the high powered circuits.

TES with Hybrid Thyristor and Switch Configuration

In a still further implementation, a hybrid solution can achieve smooth changes in load over the whole range with only one 600 Amp thyristor but multiple switched circuits. Optionally, some implementations may use more than one thyristor, but the system will have fewer thyristors than heater circuits. For example, one 600 A thyristor such as a zero fired thyristor switch (ZFTS), three 600 A circuits, and twenty seven 300 A circuits, for 9900 Amps of heater circuits. One set of busbars powers the ZFTS, and the thirty heater circuits, 9900 Amps. Each heater circuit has an inexpensive switch not designed to switch under load from the bus bar to the heater circuit. Another set of busbars 830 powered through the 600 Amp ZFTS powers conductors to sets of switches, again not designed to switch under load, to each of the heater circuits.

One non-limiting example of the method of operation: Ready to start. All switches open except the ZFTS, which is set to "zero".

Start: (1) The switch 820 from the ZFTS output to a 3-phase set of low power circuits is closed.
(2) The ZFTS 818 is ramped from zero to 100% on a 3-phase 300A load, three heater circuits.
(3) The switch closed from the 9900 Amp busbars to the 300 Amp circuit.
(4) The switch opened from the 300 Amp circuits to the ZFTS powered conductors.
(5) The ZFTS is ramped down to zero.

In the next example of circuits, the same zero addition to the 300 Amp circuits ramped to a 600 Amp addition seamlessly. All of this is simply automatically handled. If it were desired to shift from one set of circuits to another to change where the heat was being applied, the cycle would be reversed.

For Example: Assume that it is desired to power 300 Amp circuits 22, 23, & 24 and drop circuits 11, 12, &13.

Start: (1) The ZFTS 818 is at zero. The switch from the ZFTS powered conductors is closed to circuits 11, 12, &13. They are powered by the busbars.
(2) The ZFTS 818 is ramped to 100%.
(3) The switch is opened from the busbars.
(4) The ZFTS is ramped to zero.
(5) The switch is opened from the ZFTS conductors to circuits 11, 12, &13.
(6) The switch is closed from the ZFTS conductors to circuits 22, 23, & 24.
(7) The ZFTS is ramped to 100%.
(8) The switch is closed from the busbars to circuits 22, 23, & 24.
(9) The ZFTS is ramped to zero.
(10) The switch is opened from the ZFTS conductors to circuits 22, 23, & 24.

No switches were made under load. No abrupt changes in amperage occurred. The switches used in this implementation were much cheaper as they never operated under load.

In one implementation, the TES charging system 800 is configured to receive electrical power from a variable power source 810, which may be a solar photovoltaic array, wind farm, or a hybrid grid-connected source. In this non-limiting example, the system includes a single thyristor 818 that modulates power flow based on the available energy from the source.

A thyristor-side switch 820 connects the output of the thyristor 818 to a selected one of multiple load switches 820*a*, 820*b*. Each load switch controls a corresponding heater circuit 840*a*, 840*b*, or 840*c*, which is thermally coupled to a thermal energy storage blocks 850*a*, 850*b*, or 850*c*, respectively.

During operation, the TES controller 870 first sets the thyristor 818 to zero conduction. It then closes the thyristor-side switch 820 to connect the thyristor output to a selected load switch (e.g., 820*a*). The thyristor is then ramped up to full conduction. Once full conduction is reached, i.e., the voltage across the load switch is minimized, the corresponding load switch 820*a* is closed, energizing heater circuit 840*a* under no-load conditions. The thermal energy generated by the heater circuit is transferred to TES block 850*a*.

After successful transfer of conduction, the thyristor-side switch 820 is opened, and the thyristor 818 is reset to zero conduction. The TES controller 860 is coupled to the switches and thyristors as indicated by the dashed lines and may repeat this process for subsequent heater circuits based on the available power and control logic.

Electrical return is provided via return line 852. The system is capable of high-precision load matching using a single thyristor, while allowing the use of low-cost, low-duty-cycle mechanical switches due to the no-load switching technique.

In some implementations, the disclosed system addresses the problem of tripping renewable energy fields due to mismatched load response. By using discrete switch control instead of thyristor modulation, the TES system can track renewable field output with equivalent or better precision while eliminating the drawbacks associated with thyristor-based systems. Specifically: Switches allow full-capacity (100%) circuit operation, whereas thyristors often operate at reduced efficiency. The system avoids parasitic losses and expensive cooling infrastructure. Switches simplify the design and reduce system capital and operating costs. The e-house design eliminates MV presence, enabling standard licensed electricians to perform maintenance safely and economically.

The ability to precisely follow renewable field output while minimizing reliance on grid power and maximizing field utilization is a key advantage of the invention. Additionally, passive storage block configurations and warm-maintenance modes further extend flexibility and economic value.

Load Matching and Grid-Connected Operation

Some implementations provide a system and method for charging a thermal energy storage (TES) system from a variable renewable energy source, such as a solar or wind power field, while maintaining precise load tracking to prevent power source trip conditions. In one configuration, the renewable field and the TES system are both connected to a common electrical grid. The TES system charging load is dynamically controlled to follow the output of the renewable field as closely as possible. This arrangement results in minimal power draw from the grid, limited only to compensating for minor mismatches between renewable output and TES load.

Conventional systems typically maintain a safety margin, such as but not limited to about 5%, below the renewable field output to prevent overload and tripping. In contrast, the disclosed system utilizes grid buffering to absorb minor mismatches, allowing the TES to consume the full output of the renewable field, effectively maximizing utilization. The TES system includes multiple independently controlled heating circuits connected to individual sections of the storage media. These circuits may be arranged horizontally or vertically and are selectively activated based on the operating mode.

Replacement of Thyristors with Switch-Based Control

Conventional TES systems utilize thyristors to modulate load in response to source fluctuations. Thyristors and their associated cooling systems are both costly and inefficient. They typically dissipate over 1.5 watts per ampere and, in medium-sized systems, may handle currents exceeding 10,000 amperes, resulting in substantial parasitic losses.

Some implementations herein replace thyristors with a set of on-off switches, each controlling a group of three-phase heater circuits. Each switch operates at full circuit capacity (100% on or off), in contrast to thyristor modulation, which typically operates circuits at less than 80% of rated capacity. Switches offer significant advantages in simplicity, cost, and efficiency and do not require high-speed response or water-cooled systems. Switch-controlled circuits eliminate the parasitic power draw associated with thyristors and reduce system complexity and maintenance overhead.

Grid-Buffering and Load Control Methodology

The TES system dynamically adjusts the number of engaged heating circuits in response to the instantaneous output of the renewable field. When renewable output increases beyond the current TES load by approximately half the capacity of an available heating circuit, an additional switch is engaged. Conversely, when renewable output decreases below the current TES load by the same margin, a switch is disengaged. This control strategy allows the system to track the fluctuating output of the field with sufficient precision, maintaining operational stability while fully utilizing available power.

Low-Voltage Electrical House (E-House) Architecture

Another aspect of the invention involves segregation of low-voltage and medium-voltage (MV) components. MV typically refers to medium voltage, which generally falls within the range of 1,000 volts to 35,000 volts (1 kV to 35 kV). All auxiliary equipment, including pumps, fans, dampers, instrumentation, uninterruptible power supply (UPS) systems, and control hardware, is operated at ≤480 V (and in some jurisdictions ≤600 V), and housed within a dedicated electrical house (e-house). No MV components are located inside the e-house.

This configuration allows maintenance personnel with standard low-voltage electrical certifications to service the e-house while MV components remain energized externally. Additionally, the exclusion of MV equipment allows for smaller working clearances, enabling the use of compact, shippable enclosures such as 20-foot ISO shipping containers.

MV switching equipment, if required, is installed on factory-assembled outdoor skids, each less than 8 feet wide, allowing simple field deployment. This separation of power domains simplifies compliance with safety regulations, reduces on-site construction requirements, and lowers both capital and installation costs.

Elimination of Chillers and Deionized Water Systems

Thyristor-based power control systems typically require chillers and deionized (DI) water cooling systems, adding substantial cost and complexity to installation and operation. The replacement of thyristors with mechanical switches obviates the need for such systems, further simplifying operation and maintenance. The switch-based system is air-cooled and does not require specialized service personnel for coolant handling.

Configurable Thermal Storage Zones and Passive Heating

The TES system allows for variability in heater-to-storage block ratios. Not all thermal storage blocks are required to be directly heated by a dedicated circuit. In some embodiments, additional storage blocks may be included as "passive" or "passenger" blocks, receiving heat through convection or conduction from actively heated regions. These blocks are typically positioned at the discharge end of a horizontal-flow system or the upper regions of a vertical-flow system. Although these blocks charge more slowly, they increase the total storage capacity and extend discharge duration, particularly at lower output temperatures.

7. Grid-Optimized Charging and Flexible Operational Modes

The system supports multiple operational modes to optimize cost and performance. For example, when solar or wind output is insufficient, or during periods of low or negative real-time electricity pricing, the TES system may be charged directly from the grid. This flexibility allows for complete charging even under suboptimal renewable generation conditions, such as cloudy days or nighttime, leveraging off-peak grid rates.

A "warm mode" of operation is used when the TES is nearly discharged but full-scale charging is not yet economical. In this mode, limited heating is applied to maintain system temperature until a lower-cost energy period becomes available. This may involve activating one or more heating circuits at either the inlet or outlet end of the TES, depending on the direction of flow and desired thermal distribution.

After full charging, the TES may enter a "maintain" mode, in which only the inlet-end heating circuits remain engaged to retain thermal energy until discharge is required or power pricing becomes favorable again. These keep-warm modes allow the system to defer full charging until energy prices are optimal, increasing overall economic efficiency.

Summary of Claim Areas for Inventive Implementations

TES with High Efficiency Heater Control

A thermal energy storage (TES) system, including:

a storage assemblage including:

- multiple thermal energy storage blocks arranged to define multiple thermal energy storage zones in the assemblage; and
- multiple heater elements, each associated with at least one of said thermal energy storage zones; and a control system that selectively engages and disengages the heater elements to control the heating and cooling of said thermal energy storage zones, wherein the control system uses switches to control the engagement and disengagement of the heater elements; wherein the switches are configured operate to either fully energize the heater element or fully deenergize the heater element.

A method for operating a thermal energy storage (TES) system, including:

(a) selecting at least one zone thermal energy storage blocks to heat;

(b) using switches to engage an associated heater element for that zone to heat thermal storage blocks in that zone; and (c) repeating steps (a) and (b) until (i) a selected subset or, alternatively, (ii) all zones of thermal energy storage blocks are heated, wherein the switches operate to either fully energize the heater element or fully deenergize the heater element.

A method for operating a thermal energy storage (TES) system with keep-warm modes, including:

(a) selecting at least one zone thermal energy storage blocks to heat;

(b) using switches to engage an associated heater element for that zone to heat thermal storage blocks in that zone; and (c) repeating steps (a) and (b) until (i) a selected subset or, alternatively, (ii) all zones of thermal energy storage blocks are heated, wherein the switches operate to either fully energize the heater element or fully deenergize the heater element;

(d) disengaging all heater elements for all zones except one zone at one end of said thermal energy storage blocks during a period when power prices are not at maximum or minimum;

(e) maintaining a temperature profile of the TES system by keeping the heater elements engaged for the one zone; and (f) activating heater elements for a selected subset of zones of thermal energy storage blocks when a price of electricity is below a selected threshold.

A method of operating a thermal energy storage (TES) system using a thyristor and multiple of electrical heater circuits, the method including: (a) setting the thyristor to zero conduction; (b) closing a first switch to connect an output of the thyristor to a first set of heater circuits for the TES system; (c) ramping the thyristor from zero to full conduction; (d) closing a second switch to connect the first set of heater circuits to a power busbar; (e) opening the first switch to disconnect the thyristor from the first set of heater circuits; and (f) ramping the thyristor back to zero conduction, wherein all switching operations are performed under substantially zero load conditions.

Some implementations may have one or more of the following features. For example, the method may further include repeating steps (a) through (f) to sequentially engage additional sets of heater circuits in response to available power or desired thermal distribution. Optionally, each heater circuit is a three-phase circuit configured to transfer electrical energy to a thermal storage medium of the TES system. Optionally, the first and second switches are mechanical switches rated for no-load switching duty. Optionally, the method further includes disconnecting a second set of heater circuits from the power busbar by reversing the thyristor transfer sequence; redistributing heating within the TES system without switching under load.

A method of transferring power from one set of heater circuits to another in a thermal energy storage (TES) system using a thyristor, the method including: (a) setting the thyristor to zero conduction; (b) closing a first switch to connect the thyristor to a first set of heater circuits; (c) ramping the thyristor to full conduction; (d) opening a second switch to disconnect the first set of heater circuits from a power busbar; (e) ramping the thyristor to zero conduction; (f) opening the first switch to isolate the first set of heater circuits from the thyristor; (g) closing a third switch to connect the thyristor to a second set of heater circuits; (h) ramping the thyristor to full conduction; (i) closing a fourth switch to connect the second set of heater circuits to the power busbar; and (j) ramping the thyristor to zero and opening the third switch, wherein all switching operations are performed without switching under active load.

Some implementations may have one or more of the following features. For example, the transition between heater circuit sets is performed automatically using a controller in response to a shift in thermal demand within different zones of the TES system. Optionally, the TES system includes at least two or more independently switchable groups of three-phase heater circuits connected to different thermal storage sections of the TES system.

A thermal energy storage (TES) system configured for no-load switching operation, including: a power busbar configured to receive power from a source; multiple of heater circuits, each configured to convert electrical energy into heat for storage in thermal storage media; a thyristor having an input electrically connected to the power busbar and configured to be ramped from zero to full conduction and back to zero; a first switch configured to connect an output of the thyristor to a first set of the heater circuits; a second switch configured to connect the first set of heater circuits to the power busbar; and a controller configured to: (i) set the thyristor to zero conduction; (ii) close the first switch to route thyristor output to the first set of heater circuits; (iii) ramp the thyristor to full conduction; (iv) close the second switch while the thyristor is fully conducting; (v) open the first switch; and (vi) ramp the thyristor back to zero conduction, wherein all switching operations are performed under substantially zero load conditions.

Some implementations may have one or more of the following features. For example, the controller may be further configured to repeat the switching and ramping operations to sequentially engage additional sets of heater circuits based on available power or desired thermal distribution. Optionally, each heater circuit is a three-phase, 300-ampere circuit configured to heat an associated thermal storage block. Optionally, the first and second switches are mechanical switches rated for no-load switching duty.

A thermal energy storage (TES) system configured for reassigning electrical heating loads using a single thyristor and no-load mechanical switching, the system including: a power busbar; multiple of heater circuits arranged in at least two independently switchable groups; a thyristor having an input connected to the power busbar and configured for zero-fired ramping operation; a first switch configured to connect the thyristor to a first group of heater circuits; a second switch configured to connect the first group of heater circuits to the power busbar; a third switch configured to connect the thyristor to a second group of heater circuits; a fourth switch configured to connect the second group of heater circuits to the power busbar; and a controller configured to: (i) ramp the thyristor to full conduction to enable handoff between the busbar and the thyristor output; (ii) open and close the respective switches in a sequence that transfers power from the first group of circuits to the second group without performing any switching under load.

Some implementations may have one or more of the following features. For example, the controller may be configured to perform the switching and ramping sequence automatically in response to a change in thermal demand in different TES zones. Optionally, the heater circuits are coupled to separate thermal storage sections and arranged to provide zoned thermal energy distribution. Optionally, the thyristor is a zero-firing thyristor switch.

The system or method of any of the foregoing may be configured to include one or more of the following features:

A vertical flow configuration, wherein for a discharge cycle air or gas enters at the bottom of the assemblage and exits at the top.

A horizontal flow configuration, wherein for a discharge cycle air or gas enters at one end and exits at the other.

The TES system or TES includes refractory bricks or graphite materials.

The TES operates in a nitrogen or other inert gas environment.

The TES operates in air.

A grid connection supplies electricity to the TES system.

At least one section of the thermal energy storage blocks is without an associated heater element.

The claimable subject matter includes any of the systems or methods in the exemplary claims. Optionally, a method is provided including at least one technical feature from any of the prior features. Optionally, the method includes at least any two technical features from any of the prior features. Optionally, a device is provided including at least one technical feature from any of the prior features. Optionally, the device includes at least any two technical features from any of the prior features. Optionally, the system is provided including at least one technical feature from any of the prior features. Optionally, the system includes at least any two technical features from any of the prior features.

Terminology

To the extent a term used in a claim is not defined below, it should be given the broadest definition persons in the pertinent art have given that term as reflected in printed publications and issued patents at the time of filing. For example, the following terminology may be used interchangeably, as would be understood to those skilled in the art:

A Amperes
AC Alternating current
DC Direct current
DFB Dual Fluidized Bed
EAR Enhanced Oil Recovery
EV Electric vehicle
GT Gas turbine
HRSG Heat recovery steam generator
kV kilovolt
kW kilowatt
MED Multi-effect desalination
MPPT Maximum power point tracking
MSF Multi-stage flash
MW megawatt
OTSG Once-through steam generator
PEM Proton-exchange membrane
PV Photovoltaic
RSOC Reversible solid oxide cell
SOEC Solid oxide electrolyzer cell
SOFC Solid oxide fuel cell
ST Steam turbine
TES Thermal Energy Storage
TSU Thermal Storage Unit Additionally, the term "heater" is used to refer to a conductive element that generates heat. For example, the term "heater" as used in the present example implementations may include, but is not limited to, a wire, a ribbon, a tape, or other structure that can conduct electricity in a manner that generates heat. The composition of the heater may be metallic (coated or uncoated), ceramic, graphite, or other composition that can generate heat. Optionally, some embodiments may use metal or other thermally conductive conduit(s) that carry molten salt, hot air, hot fluid, hot gas, or other medium for channeling heat through the conduit(s).

Further, the term furnace and reactor can be used interchangeably in the above work meant to signify the reactor of a material processing system which, for example in the case of DRI production, may be referred to as a furnace from art approaches.

Similarly, the terms describing fluid compressions devices (such as, but not limited to, blowers, compressors, fans and pumps) can be used interchangeably.

The terms air, fluid and gas are used interchangeably herein to refer to a fluid heat transfer medium of any suitable type, including various types of gases (air, $CO_2$, oxygen and other gases, alone or in combination), and when one is mentioned, it should be understood that the others can equally well be used. Thus, for example, "air" can be any suitable fluid or gas or combinations of fluids or gases.

While foregoing example implementations may refer to "air", the inventive concept is not limited to this composition, and other fluid streams may be substituted therefor for additional industrial applications, such as but not limited to, enhanced oil recovery, sterilization related to healthcare or food and beverages, drying, chemical production, desalination and hydrothermal processing (e.g. Bayer process.) The Bayer process includes a calcination step. The composition of fluid streams may be selected to improve product yields or efficiency, or to control the exhaust stream.

In any of the thermal storage units, the working fluid composition may be changed at times for a number of purposes, including maintenance or re-conditioning of materials. Multiple units may be used in synergy to improve charging or discharging characteristics, sizing or ease of installation, integration or maintenance. As would be understood by those skilled in the art, the thermal storage units disclosed herein may be substituted with other thermal storage units having the desired properties and functions; results may vary, depending on the manner and scale of combination of the thermal storage units.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain example implementations herein is intended merely to better illuminate the example implementation and does not pose a limitation on the scope of the example implementation otherwise claimed. No language in the specification should be construed as indicating any non-claimed element essential to the practice of the example implementation.

Groupings of alternative elements or example implementations of the example implementation disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, devices, etc. described herein may be positioned in any desired orientation. Thus, the use of terms such as “above,” “below,” “upper,” “lower,” “first”, “second” or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In interpreting the specification, all terms should be interpreted in the broadest possible manner consistent with the context. In particular, the terms “includes” and “including” should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The following patent applications and patent are directed to related technologies: U.S. Provisional Patent Application No. 63/651,851 filed on May 24, 2024; U.S. patent application Ser. No. 18/633,425 filed on Apr. 11, 2024; U.S. patent application Ser. No. 17/537,407 (filed Nov. 29, 2021; issued as U.S. Pat. No. 11,603,776 on Mar. 14, 2023); and International Patent Application No.: PCT/US2021/061041 (filed Nov. 29, 2021). U.S. Provisional Patent Application No. 63/651,851 filed on May 24, 2024. The foregoing applications and patent are incorporated herein by reference in their entirety for all purposes.

While the foregoing describes various example implementations of the example implementation, other and further example implementations of the example implementation may be devised without departing from the basic scope thereof. The scope of the example implementation is determined by the claims that follow. The example implementation is not limited to the described example implementations, versions or examples, which are included to enable a person having ordinary skill in the art to make and use the example implementation when combined with information and knowledge available to the person having ordinary skill in the art.

What is claimed is:

1. A method of operating a thermal energy storage (TES) system using a thyristor and multiple of electrical heater circuits, the method including:

(a) setting the thyristor to zero conduction;

(b) closing a first switch to connect an output of the thyristor to a first set of heater circuits for the TES system;

(c) ramping the thyristor from zero to full conduction;

(d) closing a second switch to connect the first set of heater circuits to a an electrical input;

(e) opening the first switch to disconnect the thyristor from the first set of heater circuits; and (f) ramping the thyristor back to zero conduction;

wherein switching operations in steps (b), (d) and (e) are performed under substantially zero load conditions.

2. The method of claim 1, further including repeating steps (a) through (f) to sequentially engage additional sets of heater circuits in response to available power or desired thermal distribution.

3. The method of claim 1, wherein each heater circuit is a three-phase circuit configured to transfer electrical energy to a thermal storage medium of the TES system.

4. The method of claim 1, wherein the first and second switches are mechanical switches rated for no-load switching duty.

5. The method of claim 1, further including:

disconnecting a second set of heater circuits from the electrical input by reversing a thyristor transfer sequence;

redistributing heating within the TES system without switching under load.

6. A thermal energy storage (TES) system configured for no-load switching operation, including:

multiple of heater circuits, each configured to convert electrical energy into heat for storage in thermal storage media;

a thyristor configured to be ramped from zero to full conduction and back to zero;

a first switch configured to connect an output of the thyristor to a first set of the heater circuits;

a second switch configured to connect the first set of heater circuits to an electrical input; and a controller configured to:

(i) set the thyristor to zero conduction;

(ii) close the first switch to route thyristor output to the first set of heater circuits;

(iii) ramp the thyristor to full conduction;

(iv) close the second switch while the thyristor is fully conducting to connect the first set of heater circuits to the electrical input;

(v) open the first switch; and (vi) ramp the thyristor back to zero conduction, wherein switching operations in steps (b), (d) and (e) are performed under substantially zero load conditions.

7. A thermal energy storage (TES) system configured for no-load switching operation, including:

multiple of heater circuits, each configured to convert electrical energy into heat for storage in thermal storage media;

a thyristor configured to be ramped from zero to full conduction and back to zero;

a first switch configured to connect an output of the thyristor to a first set of the heater circuits;

a second switch configured to connect the first set of heater circuits to an electrical input; and a controller configured to:

(i) set the thyristor to zero conduction;

(ii) close the first switch to route thyristor output to the first set of heater circuits;

(iii) ramp the thyristor to full conduction;

(iv) close the second switch while the thyristor is fully conducting to connect the first set of heater circuits to the electrical input;

(v) open the first switch; and (vi) ramp the thyristor back to zero conduction, wherein switching operations in steps (b), (d) and (e) are performed under substantially zero load conditions;

wherein the controller is further configured to repeat the switching and ramping operations to sequentially engage additional sets of heater circuits based on available power or desired thermal distribution.

8. The system of claim 6, wherein each heater circuit is a three-phase, 300-ampere circuit configured to heat an associated thermal storage block.

9. The system of claim 6, wherein the first and second switches are mechanical switches rated for no-load switching duty.

* * * * *